(12) United States Patent
Shindo et al.

(10) Patent No.: US 6,758,721 B2
(45) Date of Patent: Jul. 6, 2004

(54) APPARATUS AND METHOD FOR LAPPING MAGNETIC HEADS

(75) Inventors: Hiroshi Shindo, Tokyo (JP); Akio Ogawa, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/914,415

(22) Filed: Aug. 27, 2001

(65) Prior Publication Data

US 2002/0077044 A1 Jun. 20, 2002

Related U.S. Application Data

(63) Continuation of application No. PCT/JP01/00035, filed on Jan. 9, 2001.

(30) Foreign Application Priority Data

Jan. 7, 2000 (JP) ........................................ 2000/001640

(51) Int. Cl.$^7$ .............................................. B24B 49/00
(52) U.S. Cl. ............................ 451/5; 451/364; 451/366; 451/392; 451/403; 451/405
(58) Field of Search ............................ 451/5, 364, 366, 451/392, 403, 405

(56) References Cited

U.S. PATENT DOCUMENTS

| 5,203,119 A | * | 4/1993 | Cole ............................ 451/11 |
| 5,620,356 A | | 4/1997 | Lackey et al. |
| 6,050,878 A | * | 4/2000 | Kanzo et al. .................. 451/5 |
| 6,095,895 A | | 8/2000 | Fujita et al. |
| 6,217,425 B1 | * | 4/2001 | Shindou et al. ............. 451/259 |

FOREIGN PATENT DOCUMENTS

| JP | 04053672 A | 2/1992 |
| JP | 2861291 B2 | 12/1998 |
| JP | 11-42525 A | 2/1999 |
| JP | 2000-11315 A | 1/2000 |

* cited by examiner

*Primary Examiner*—Joseph J. Hail, III
*Assistant Examiner*—Shantese McDonald
(74) *Attorney, Agent, or Firm*—Cohen, Pontani, Lieberman & Pavane

(57) ABSTRACT

An apparatus for lapping a workpiece including a plurality of magnetic heads supported by a tool is disclosed. The lapping apparatus comprises a rotary-lapping table having an abrasive surface, and a lapping device assembly provided so as to be movable with respect to the abrasive surface of the lapping table. The lapping device assembly includes a device provided at a lower portion of the lapping device assembly for supporting the tool and a device for respectively applying predetermined loads to a plurality of load applying portions of the tool. The load applying portions of the tool is disposed along the longitudinal direction of the tool. The load-applying device applies the loads from a plurality of different directions to at least one of the load applying portions of the tool so that the tool is deformed into a predetermined shape.

14 Claims, 27 Drawing Sheets

APPARATUS AND METHOD FOR LAPPING MAGNETIC HEADS

This application is a Continuation Application of International Application PCT/JP01/00035 (not published in English) filed Jan. 9, 2001.

BACKGROUND OF THE INVENTION

1. Field of the Invention

The present invention relates an apparatus and a method for lapping magnetic heads, and in particular to an apparatus and a method for lapping a workpiece provided with a plurality of magnetic heads supported by a tool.

2. Description of the Related Art

Conventionally, a thin film magnetic head, which is used in a disc drive in a computer, is manufactured in a batch process. In this process, a workpiece, provided with a ceramic bar (thereafter being divided into sliders) on which a row of transducers including a plurality of thin film magnetic heads are arranged, is lapped such that throat heights in gaps of the respective transducers are adjusted to have desired values at which optimum data signal processing can be realized.

A problem that exists in lapping such magnetic heads so as to obtain desired throat heights is that the ceramic bar or the workpiece is stressed and/or has an undesirable curvature or bow. Namely, when the ceramic bar is stressed and/or has an undesirable curvature or bow, a lapping apparatus can not uniformly lap the ceramic bar. For example, even if the throat heights of the magnetic heads on a center of the ceramic bar have optimum values, the throat heights of the magnetic heads on both ends of the ceramic bar might be too low or too high to have optimum values.

An apparatus for lapping magnetic heads, which can solve such problem, is disclosed in U.S. Pat. No. 5,620,356. A ceramic bar is adhered to a bottom of a tool, which likes a long thin plate. The apparatus adjusts throat heights of thin film magnetic heads arranged on the ceramic bar to be optimum by correcting the curvature of the ceramic bar and lapping the corrected ceramic bar while measuring resistances whose values are changed by the throat heights.

In the lapping apparatus disclosed in the U.S. patent, the curvature of the ceramic bar is corrected by applying loads in up and down directions to three portions of the tool provided along the longitudinal direction of the tool. The applied loads are changed in accordance with the abrasive amount of the magnetic heads obtained by resistances changed by the throat heights.

The throat heights of the magnetic heads need to be lapped with higher accuracy in the feature. However, as mentioned above, the lapping apparatus disclosed in the U.S. Patent applies loads in an up and down direction to three portions of the tool provided along the longitudinal direction of the tool. The lapping apparatus therefore can only deform the ceramic bar into such a shape that is approximated by a fourth order curve. As a result, shape patterns of the throat heights of the values of the magnetic heads to be lapped are limited to curves, which are approximated by a fourth order curve or a less than fourth order curve.

On the contrary, the distribution of values of the throat heights of the ceramic bar lapped by a conventional lapping apparatus actually has a complicate shape pattern such as a shape pattern which is approximated by a sixth order curve or a more than sixth order curve. The conventional lapping apparatus therefore can not correct the throat heights with accuracy in the case that the distribution pattern of the throat heights has such complicate shape pattern.

FIG. 28 shows a distribution of values of throat heights of the ceramic bar along a longitudinal direction of the bar when a conventional lapping apparatus laps a 50 mm long ceramic bar by automatically controlling throat heights of the bar. In FIG. 28, a solid line is a sixth order curve showing a distribution pattern of values of the throat heights of the bar, and a broken line is a fourth order curve showing a distribution pattern of values of the throat heights of the bar. As clearly shown in FIG. 28, the actual distribution pattern of values of the throat heights of the bar can be accurately approximated by the solid line of the sixth order curve.

As mentioned above, the actual distribution pattern of the values of the throat heights of the bar can be approximated by a sixth order curve or a more than sixth order curve. On the contrary, shape patterns of the throat heights of the magnetic heads to be lapped are limited to curves which are approximated by a fourth order curve or a less than fourth order curve when using a conventional lapping apparatus. Therefore, as show in FIG. 28, the conventional lapping apparatus can not correct portions having distribution pattern of the throat heights of the bar which are only approximated by high order curves.

Accordingly, the conventional lapping apparatus can not correct the throat heights of the ceramic bar with accuracy if the throat heights of the magnetic heads need to be lapped with higher accuracy.

SUMMARY OF THE INVENTION

It is therefore an object of the present invention to provide an apparatus and method for lapping magnetic heads which can accurately correct a curvature or bow of a workpiece.

It is another object of the present invention to provide an apparatus and method for lapping magnetic heads which can accurately correct a curvature or bow of a workpiece in accordance with a distribution pattern thereof.

The above objects are achieved according to the present invention by providing an apparatus for lapping a workpiece including a plurality of magnetic heads supported by a tool, the apparatus comprising a rotary lapping table having an abrasive surface, a lapping device assembly provided so as to be movable with respect to the abrasive surface of the lapping table, the lapping device assembly including means provided at a lower portion of the lapping device assembly for supporting the tool and means for respectively applying predetermined loads to a plurality of load applying portions of the tool, the load applying portions of the tool being disposed along the longitudinal direction of the tool, and the load applying means applying the loads from a plurality of different directions to at least one of the load applying portions of the tool so that the tool is deformed into a predetermined shape.

In a preferred embodiment of the present invention, the load applying means has means for applying a vertical load to at least one of the load applying portions of the tool.

In a further preferred embodiment of the present invention, the load applying means has means for applying a horizontal load to at least one of the load applying portions of the tool.

In a further preferred embodiment of the present invention, the load applying means has means for applying a rotating load to at least one of the load applying portions of the tool.

In a further preferred embodiment of the present invention, the tool supporting means supports the tool at about a longitudinal center portion of the tool.

In a further preferred embodiment of the present invention, the lapping device assembly further includes means for tilting the lapping device assembly about a tilt shaft parallel with the abrasive surface.

In a further preferred embodiment of the present invention, the apparatus further comprises means for oscillating the lapping device assembly in a predetermined angle.

The above objects are also achieved according to the present invention by providing a method for lapping a workpiece including a plurality of magnetic heads, the method comprising the steps of providing a tool for supporting the workpiece, a rotary lapping table having an abrasive surface, and a lapping device assembly provided so as to be movable with respect to the abrasive surface of the lapping table, said lapping device assembly including means provided at a lower portion of the lapping device assembly for supporting the tool, attaching the tool to the tool supporting means of the lapping device assembly, the tool having a plurality of load applying portions disposed along the longitudinal direction thereof, and lapping the plurality of magnetic heads of the workpiece by applying the loads from a plurality of different directions to at least one of the load applying portions of the tool so that the tool is deformed into a predetermined shape.

In a preferred embodiment of the present invention, the lapping step includes the step of applying a vertical load to at least one of the load applying portions of the tool.

In a further preferred embodiment of the present invention, the lapping step includes of the step of applying a horizontal load to at least one of the load applying portions of the tool.

In a further preferred embodiment of the present invention, the lapping step of includes the step of applying a rotating load to at least one of the load applying portions of the tool.

In a further preferred embodiment of the present invention, the tool supporting means supports the tool at about a longitudinal center portion of the tool.

In a further preferred embodiment of the present invention, the method further comprises the step of tilting the lapping device assembly about a tilt shaft parallel with the abrasive surface.

In a further preferred embodiment of the present invention, the method further comprises the step of oscillating the lapping device assembly in a predetermined angle.

The above and other objects and features of the present invention will be apparent from the following description by taking reference with accompanying drawings employed for preferred embodiments of the present invention.

DETAILED DESCRIPTION OF THE PREFERRED EMBODIMENTS

Hereinafter, preferred embodiments of the present invention will be explained with reference to the drawings.

Figure 1:
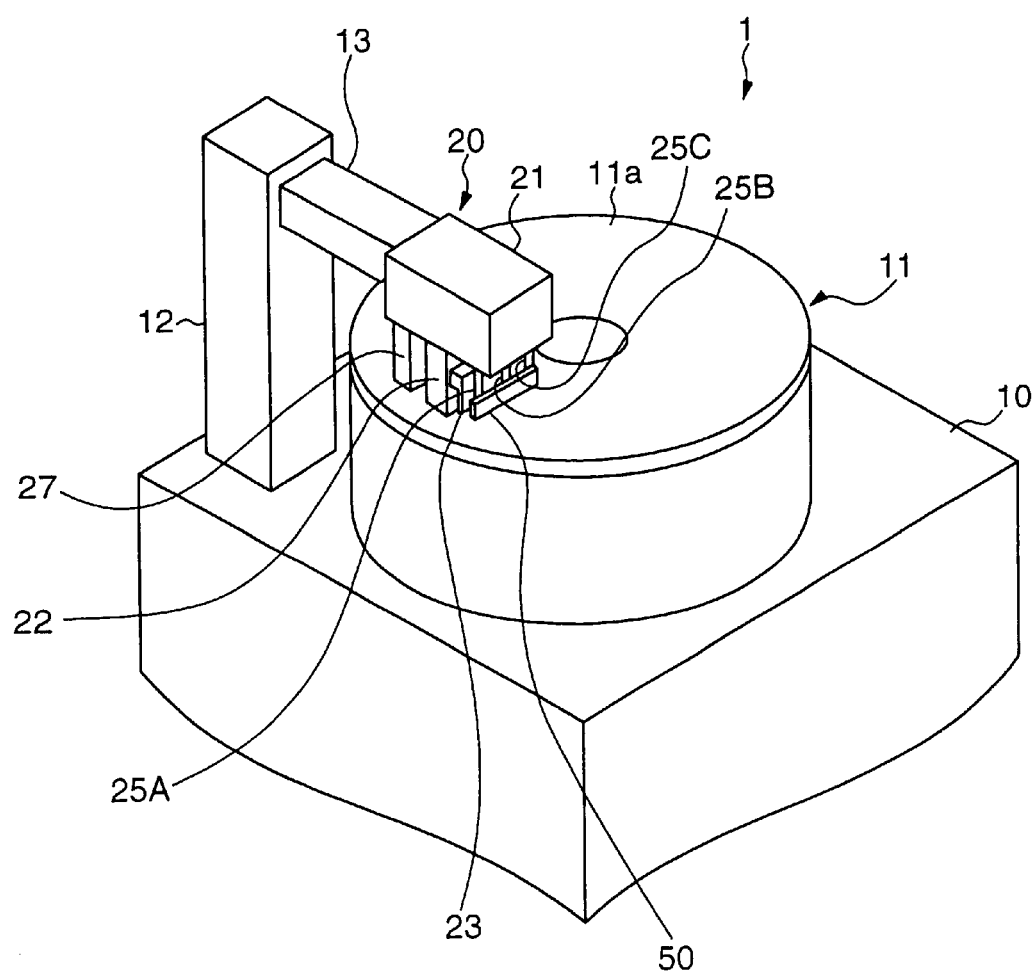
FIG. 1 is an overall perspective view showing an apparatus for lapping magnetic heads according to a first embodiment of the present invention.

First, a first embodiment of the present invention will be explained with reference to FIGS. 1–8. FIG. 1 is an overall perspective view showing an apparatus for lapping magnetic heads according to a first embodiment of the present invention. A lapping apparatus 1 comprises a base table 10, a rotary lapping table 11 disposed on the base table 10, a support column 12 disposed beside the lapping table 11 and on the base table 10, and a lapping device assembly 20 attached to the support column 12 through an arm 13. The rotary lapping table 11 is provided with an abrasive surface 11a that contacts with a bar.

The lapping device assembly 20 is provided with a supporting member 27 connected to the arm 13, a base member 22 disposed in front of the supporting member 27, a tool supporting assembly 23 disposed in front of the base member 22, and three load applying rods 25A, 25B and 25C disposed in front of the tool supporting assembly 23 and equally spaced apart. Upper portions of the supporting member 27, the base member 22 and the load applying rods 25A, 25B and 25C are covered by a cover member 21. The base member 22 is through an arm (not shown) connected to an actuator (not shown) disposed within the supporting member 27 so as to be movable in up and down directions. A transversely long tool 50 is fixed to the tool supporting assembly 23.

Figure 2:
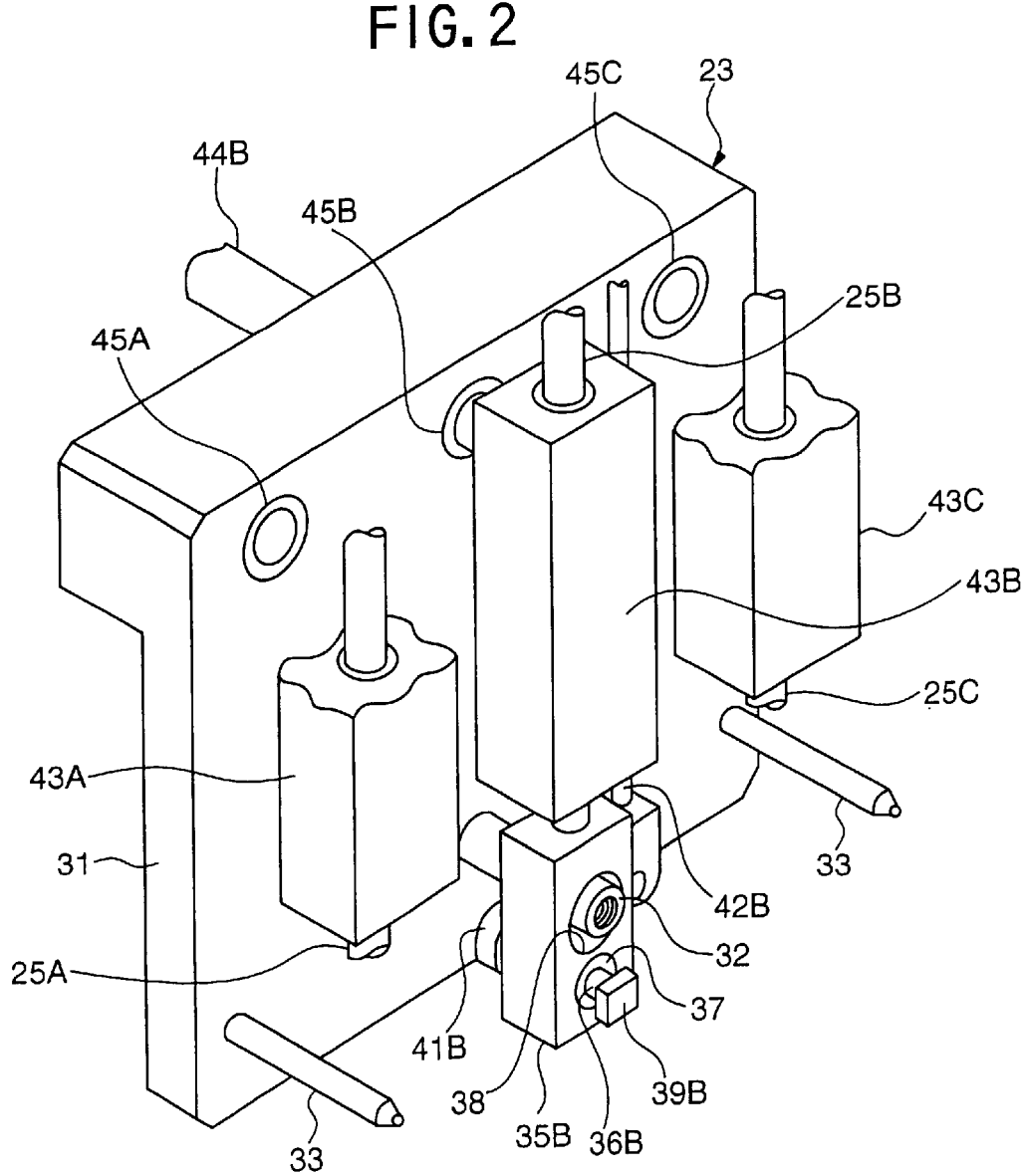
FIG. 2 is a perspective view showing a tool-supporting portion of FIG. 1.
Figure 3:
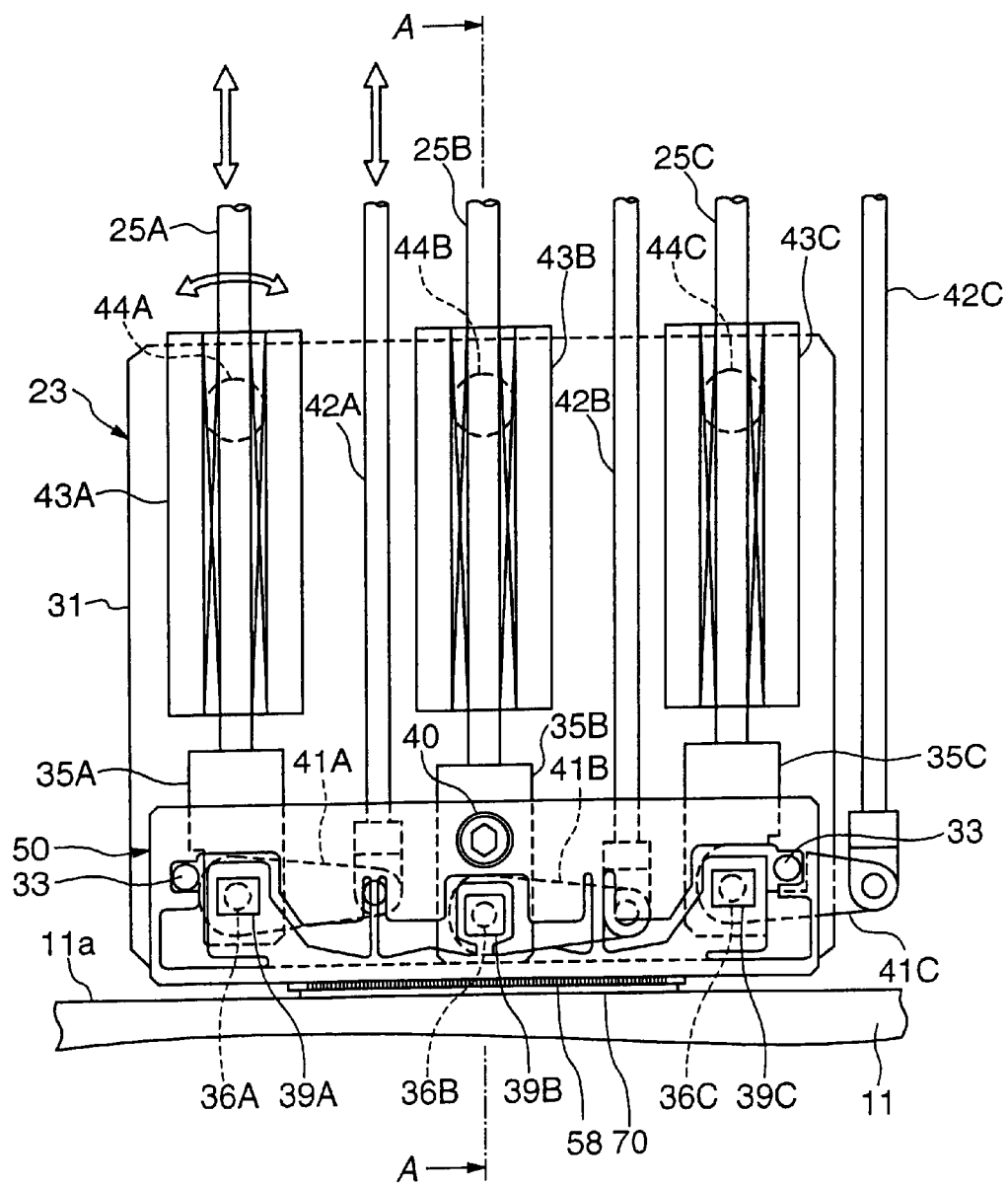
FIG. 3 is a front view showing a tool attached to the tool-supporting portion.
Figure 4:
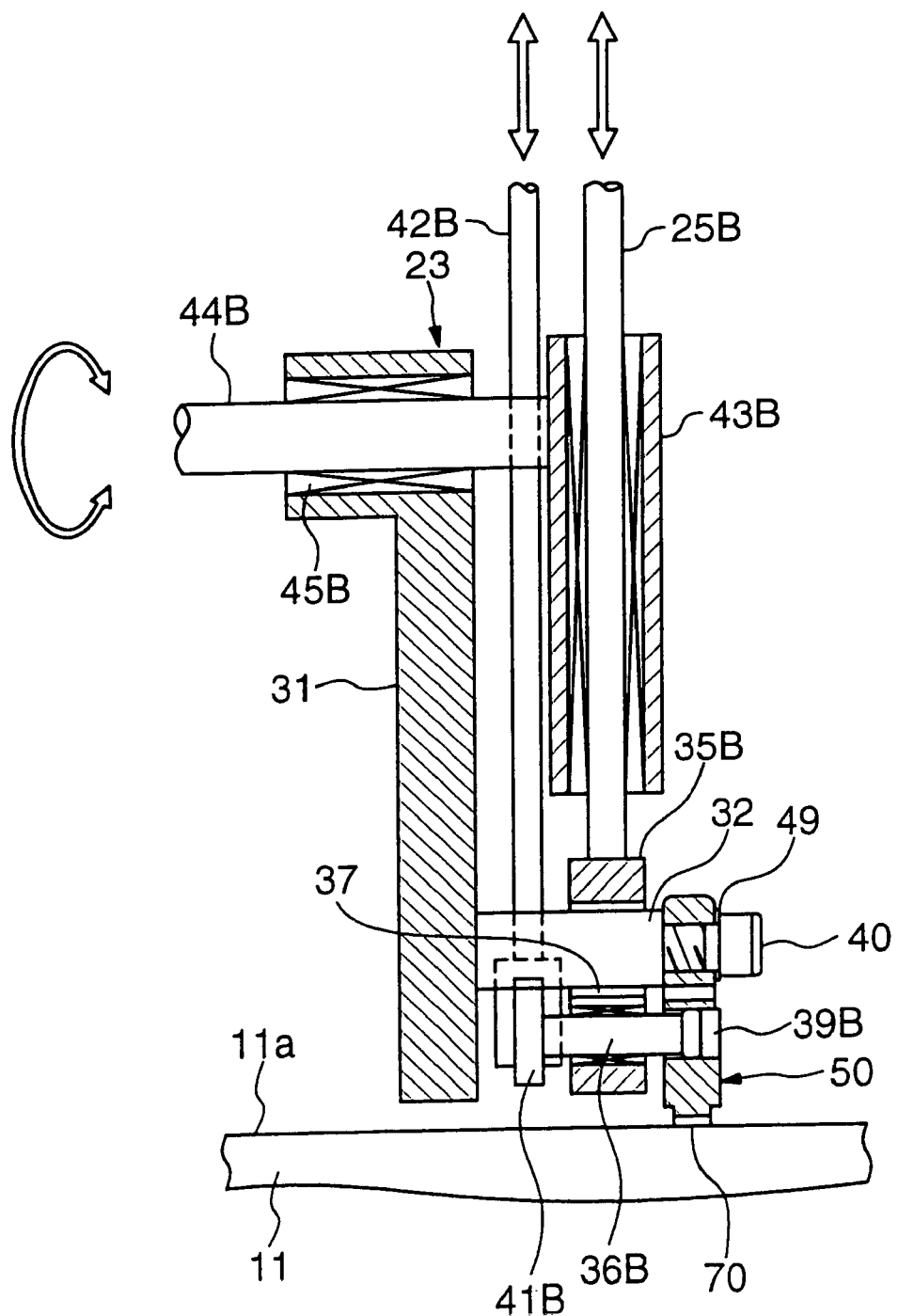
FIG. 4 is a sectional view taken along an A—A line of FIG. 3.

Referring to FIGS. 2–4, the tool supporting assembly 23 is provided with a supporting body member 31, a tool fixing pin 32 disposed on a front lower center surface of the supporting body member 31 so as to project toward the front side, and guide pins 33 disposed on a front surface at lower both ends of the supporting body member 31 for preventing a tool 50 from rotating. The guide pins 33 are formed like column shapes and their diameters become gradually smaller toward the front side. The tool-fixing pin 32 is provided with a female screw thread on the front portion thereof. The tool 50 is fixed to the tool-fixing pin 32 through a bolt 40.

Rectangular parallelepiped load applying blocks 35A, 35B and 35C are fixed to the lower portion of the load applying rods 25A, 25B and 25C. The load applying blocks 35A, 35B and 35C are respectively provided with bearings 37 at their lower ends. Load applying pins 36A, 36B and 36C, which will be explained below, are inserted into the bearings 37 so as to rotate. The load applying block 35B is also provided with a through hole 38 in which the tool fixing pin 32 is inserted and the load applying block 35B is movable in an up and down direction (or a vertical direction) and a right and left direction (a horizontal direction) in respective predetermined distances.

The load applying pins 36A, 36B and 36C are respectively inserted into the bearings 37 and front portions of the pins 36A, 36B and 36C respectively project from the front surfaces of the load applying blocks 35A, 35B and 35C. The load applying pins 36A, 36B and 36C are respectively provided with rectangular heads 39A, 39B and 39C at the front ends thereof. The rear ends of load applying pins 36A, 36B and 36C are respectively connected to one ends of levers 41A, 41B and 41C which are disposed between the supporting body member 31 and the load applying blocks 35A, 35B and 35C. Other ends of the levers 41A, 41B and 41C are pivotally connected to lower ends of shafts 42A, 42B and 42C. The shafts 42A, 42B and 42C work to oscillate the levers 41A, 41B and 41C.

Supporting member 43A, 43B and 43C are respectively disposed above the load applying blocks 35A, 35B and 35C to support the load applying rods 25A, 25B and 25C so as to be movable in up and down directions and rotatable. The front ends of drive rods 44A, 44B and 44C are respectively fixed to the rear ends of the supporting member 43A, 43B and 43C. These drive rods 44A, 44B and 44C are inserted into bearings 45A, 45B and 45C provided within the supporting body member 31 and the rear portions of the drive rods 44A, 44B and 44C extend into the base member 22.

The load applying rods 25A, 25B and 25C are driven in up and down directions by respective actuators (not shown) installed within the base member 22. The drive rods 44A, 44B and 44C are driven in rotating directions by other respective actuators (not shown) installed within the base member 22. The shafts 42A, 42B and 42C are driven in up and down directions by further other respective actuators (not shown) installed within the base member 22.

Figure 5:
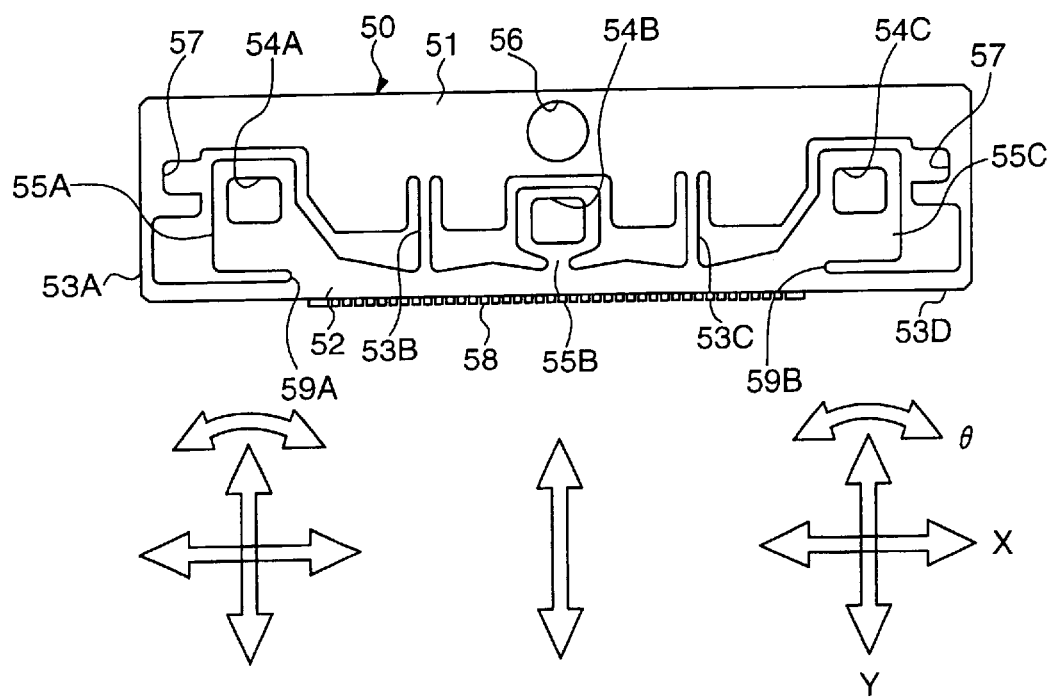
FIG. 5 is a front view showing a tool.

The tool 50 will be explained in detail with reference to FIG. 5. Referring to FIG. 5, the tool 50 is a transversely long plate. The tool 50 is comprised of a body portion 51 fixed to the lapping apparatus 1 shown in FIG. 1, a supporting portion 52 for supporting a bar or workpiece 70, four connecting portions 53A–53D for connecting the supporting portion 52 with the body portion 51, three load applying portions 54A–54C connected to supporting portion 52 for applying loads to deform the supporting portion 52, and arm portions 55A–55C connecting the load applying portions 54A–54C to the supporting portion 52.

The tool 50 is further comprised of a fixing hole 56, which is located on the center of the longitudinal direction and on an upper side of the vertical direction thereof. A bolt 40 is inserted into the fixing hole 56 to connect the body portion 51 with the tool-fixing pin 32 of the lapping apparatus 1. The body portion 51 is provided with engaging portions 57 with which the guide pins 33 are respectively engaged. The engaging portions 57 are located to correspond to the guide pins 33 when the fixing hole 56 of the tool 50 is aligned with the tool fixing pin 32 of the lapping apparatus 1.

The supporting portion 52 has an elongated beam structure that can be bent when a force or load is applied to the supporting portion 52. The supporting portion 52 is provided at its lower end with a bar fixing portion 58 to which the bar or workpiece 70 is fixed. The bar fixing portion 58 is provided with a plurality of grooves into which bar cutting blades (not shown) enter when the bar or workpiece 70 is cut off.

As shown in FIG. 5, a longitudinal direction, namely a right and left direction or a horizontal direction, of the tool 50 is called as an X-direction. An up and down direction or a vertical direction of the tool 50 is called as a Y-direction. The rotating direction of the tool 50 about the axis vertical to both X-direction and Y-direction is called as a θ-direction.

The load applying portions 54A and 54C located at both ends of the tool 50 respectively have three degrees of freedom of the X-direction, the Y-direction and the θ-direction. Namely, the load applying portions 54A and 54C are movable in three directions of the X-direction, the Y-direction and the θ-direction with respect to the body portion 51 of the tool 50. The load applying portion 54B located at the center of the tool 50 has one degree of freedom of the Y-direction. Namely, the load-applying portion 54B is movable only in the Y-direction with respect to the body portion 51 of the tool 50.

The load applying portions 54A and 54C having three degrees of freedom are respectively provided with holes having shapes other than round shapes so as to receive loads from three different directions. The load-applying portion 54B is also provided with a hole whose shape is as same as those of the load applying portions 54A and 54C.

The two arm portions 55A and 55C respectively connect the load-applying portion 54A and 54C with the supporting portion 52. The centers of the load applying portions 54A and 54C are located outside of the longitudinal direction of the supporting portion 52 regarding rotation centers 59A and 59B about which the supporting portion 52 rotates and deforms when the load applying portions 54A and 54C receive loads. Namely, the arm portions 55A and 55C respectively have overhang structures, which overhang outside of the longitudinal direction of the supporting portion 52 regarding rotation centers 59A and 59B. The center arm portion 55B has a shorter length in the Y-direction in comparison with the other arm portions 55A and 55C and connects the center portion of the supporting portion 52 with the load-applying portion 54B without the overhang thereof.

The two engaging portions 57 of the tool 50 are formed above the connecting portions 53A and 53D in the body portion 51 and are cut off to be open toward the longitudinally inner side of the tool 50. The engaging portions 57 are respectively provided with two surfaces, which are parallel to the longitudinal direction of the tool 50. Each distance between the two parallel surfaces is a bit larger than the diameter of the guide pin 33. The guide pins 33 are respectively inserted into the engaging portions 57 with desired clearances in an up and down direction. The rotation movement of the body portion 51 about the fixing hole 56 is limited by the guide pins 33 and the two parallel surfaces of the engaging portions 57. The horizontal movement of the body portion 51 is permitted in a predetermined distance by the guide pins 33.

Next, how to attach the tool 50 to the lapping apparatus 1 will be explained with reference to FIGS. 3 and 4. First, the bar or workpiece 70 is fixed by adhesive material or the like to the bar fixing portion 58 of the tool 58 so that the medium facing surface of the bar 70 faces downwardly. The tool 50 is disposed in front of the load applying blocks 35A, 35B and 35C. At this time, the guide pins 33 are respectively engaged with the engaging portions 57 of the tool 50, and the head portions 39A, 39B and 39C of the load applying pins 36A, 36B and 36C are respectively inserted into the load applying portions 54A, 54B and 54C. Further, the tool 50 is adjusted so that the fixing hole 56 of the tool 50 is corresponded in locations with the tool fixing pin 32 of the lapping apparatus 1. Under this condition, the bolt 40 is inserted through a washer 49 into the fixing hole 56 from the front side of the tool 50, and then the bolt 40 is threadedly engaged with the female screw threads of the tool fixing pin 32. Thus, the tool 50 is sandwiched through the washer 49 by the seat surface of the bolt 40 and the top end surface of the tool fixing pin 32, and the tool 50 is finally fixed to the tool fixing pin 32.

An operation of the lapping apparatus 1 will be explained below with reference to FIGS. 3 and 4.

After the tool 50 provided with the bar or workpiece 70 is fixed to the lapping apparatus 1 as mentioned above, the tool 50 is disposed so that one surface of the tool 50 to be lapped is contacted with the abrasive surface 11a of the rotary lapping table 11. Under this condition, when the load applying rods 25A, 25B and 25C are driven to move in an up and down direction, the load applying blocks 35A, 35B and 35C are moved in the up and down direction, the load applying pins 36A, 36B and 36C penetrating through the load applying blocks 35A, 35B and 35C are moved in the up and down direction, and the head portions 39A, 39B and 39C are finally moved in the up and down direction. Thus, the Y-direction load can be applied to the load applying portions 54A, 54B and 54C of the tool 50.

Further, under this condition, when the drive rods 44A and 44C are driven to rotate in a rotating direction, the supporting members 43A and 43C are rotated about the axes of the drive rods 44A and 44C, and the lower end portions of the load applying rods 25A and 25C are rotated in the direction of the rotations of the drive rods 44A and 44C. Finally, the load applying blocks 35A and 35C are rotated about the axes of the drive rods 44A and 44C in the rotating directions. Since the moving distances in the rotating directions of the load applying blocks 35A and 35C are relatively short in comparison with the distances between the drive rods 44A and 44C and the load applying blocks 35A and 35C, the movements of the load applying blocks 35A and 35C are considered to be approximately linear in right and left directions. When the load applying blocks 35A and 35C are moved in the right and left directions, the load applying pins 36A and 36C penetrating through the load applying blocks 35A and 35C are moved in the right and left directions, and the head portions 39A and 39C are finally moved in the right and left directions. Thus, the X-direction load can be applied to the load applying portions 54A and 54C of the tool 50.

Further, under this condition, when the shafts 42A and 42C are driven to move in up and down directions, the levers 41A and 41C are oscillated, and the load applying pins 36A and 36C connected to the levers 41A and 41C are rotated. Thus, the θ-direction load whose rotation centers are centers of the load applying portions 54A and 54C can be applied to the load applying portions 54A and 54C of the tool 50.

Thus, when the loads are applied from the various different directions to the load applying portions 54A, 54B and 54C of the tool 50, the supporting portion 52, the bar fixing portion 58 and the bar or workpiece 70 are deformed. Therefore, while controlling the values of the throat heights of the magnetic heads in the bar or workpiece 70 to be target values, the surface of the bar or workpiece 70 can be lapped.

According to the lapping apparatus 1 of the first embodiment of the present invention, if the distribution of the values of the throat heights of the respective magnetic heads of the bar or workpiece 70 is a complicated pattern such as a pattern approximated by a high order curve before the lapping of the bar or workpiece 70, the supporting portion 52 of the tool 50 can be deformed so as to accurately correspond to the distribution pattern of the values of the throat heights. As a result, the throat heights of the respective magnetic heads can be accurately lapped along the entire length of the bar or workpiece 70 within a predetermined permissible range.

In the above mentioned first embodiment using the tool 50 of FIG. 5, the load applying portions 54A and 54C are movable in the three directions of the X-direction, the Y-direction and the θ-direction, and the load applying portion 54B is movable only in the Y-direction. Therefore, when the tool 50 of FIG. 5 is used, the drive rod 44B for moving the load applying portion 54B in the X-direction and the shaft 42B and the lever 41B for rotating the load applying portion 54B in the θ-direction are not used. Accordingly, the drive rod 44B, the shaft 42B and the lever 41B may not be provided in the lapping apparatus 1 of the first embodiment of the present invention.

Figure 6:
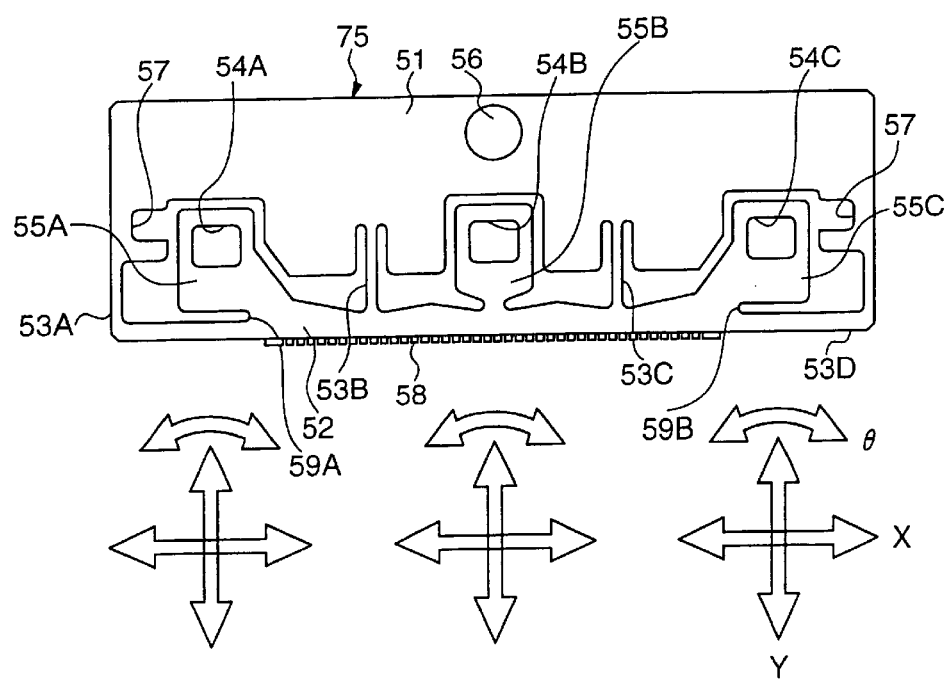
FIG. 6 is a front view showing another example of a tool that is used in the first embodiment of the apparatus for lapping magnetic heads.

Another example of a tool which may be used in the first embodiment of the present invention will be explained with reference to FIG. 6. Referring to FIG. 6, a tool 75 is longer in an up and down direction than the tool 50 of FIG. 5. The center load applying portion 54B of the tool 75 is located in a higher position than the that of the tool 50, and the load applying portions 54A, 54B and 54C are all located at about a center in an up and down direction of the body portion 51. Thus, the arm portion 55B of the tool 75 is longer than that of the tool 50.

The three load applying portions 54A, 54B and 54C of the tool 75 respectively have three degrees of freedom of the X-direction, Y-direction and the θ-direction. Namely, the load applying portions 54A, 54B and 54C are movable in the three directions of the X-direction, Y-direction and the θ-direction.

After the tool 75 is attached to the lapping apparatus 1 shown in FIGS. 1–4, when the drive rod 44B is driven to rotate in the rotating direction, the supporting member 43B is rotated about the drive rod 44B, and the lower end portion of the load applying rod 25B is moved in the rotating direction whose center is the drive rod 44B. Then, the load-applying block 35B is moved in the rotating direction whose center is the drive rod 44B. The load applying pin 36b penetrating through the load applying block 35B is moved in the right and left direction together with the head portion 39B. Thus, the load of the X-direction can be applied to the load-applying portion 54B of the tool 75.

Further, when the shaft 42B is driven in an up and down direction, the lever 41B is oscillated and the load-applying pin 36B connected with the lever 41B is rotated. Thus, the load of the θ-direction whose rotating center is the center of the load applying portion 54B can be applied to the load applying portion 54B of the tool 75.

In the lapping apparatus 1 provided with the tool 75 of the first embodiment, a plurality of loads applied to the three load applying portions 54A, 54B and 54C in the different directions can be combined. Therefore, the supporting portion 52 of the tool 75 can be deformed to have a more complicated shape, which is approximated by an eighth order curve or a more than eighth degree curve, than that of the tool 50 of FIG. 5.

Figure 7:
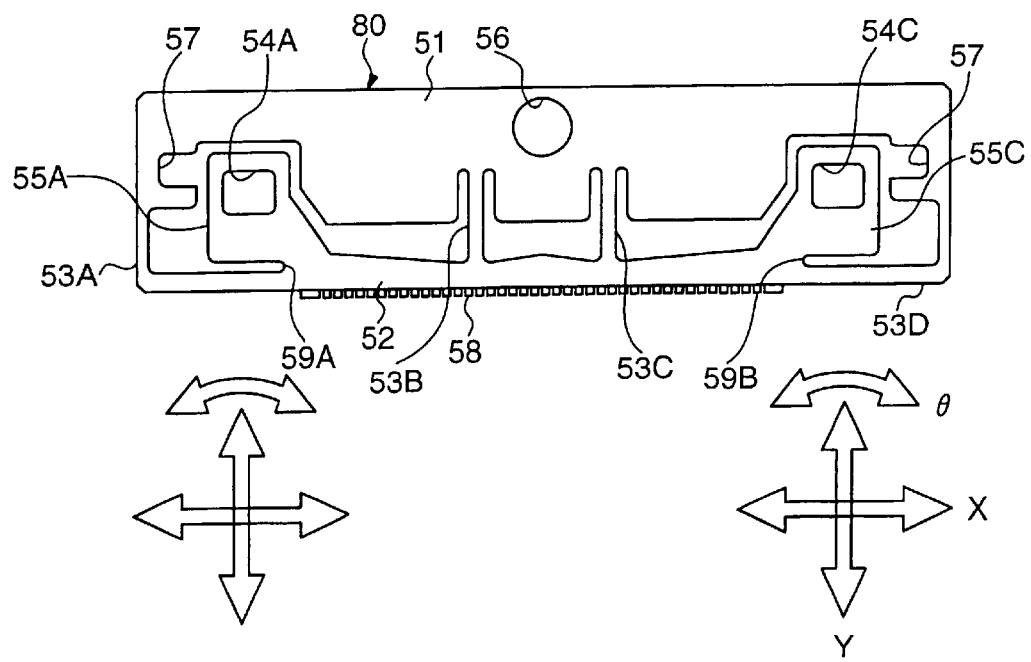
FIG. 7 is a front view showing further another example of a tool which is used in the first embodiment of the apparatus for lapping magnetic heads.

Further, another example of a tool which may be used in the first embodiment of the present invention will be explained with reference to FIG. 7. Referring to FIG. 7, a tool 80 is different from the tool 50 of FIG. 5 regarding that the load applying portion 54B and the arm portion 55B are not provided in the tool 80 and the intermediate connecting portions 53B and 53C of the tool 80 are moved to the center area of the tool. Further, in the portion between the connecting portions 53B and 53C of the supporting portion 52, the portion near the connecting portions 53B and 53C of the supporting portion 52 is most thin and the portion at the center area of the supporting portion 52 is relatively thick. Thus, the supporting portion 52 of the tool 80 has high rigidity.

In the lapping apparatus 1 of FIGS. 1–4 provided with the tool 80 of FIG. 7, a plurality of loads applied to the two load applying portions 54A and 54C in the different directions may be combined. Therefore, the supporting portion 52 of the tool 75 can be deformed to have a complicated shape.

In the case of the lapping apparatus 1 of the first embodiment provided with the tool 80 of FIG. 7, only the two load applying portions 54A and 54C provided at the both ends of the tool 80 are movable in the three directions of the X-direction, Y-direction and the θ-direction. As a result, the drive rod 44B for moving the center load applying portion 54B in the X-direction, the load applying rod 25B for moving the portion 54B in the Y-direction and the shaft 42B and the lever 41B both for moving the portion 54B in the θ-direction may not be provided in the lapping apparatus 1 of FIGS. 1–4.

Figure 8:
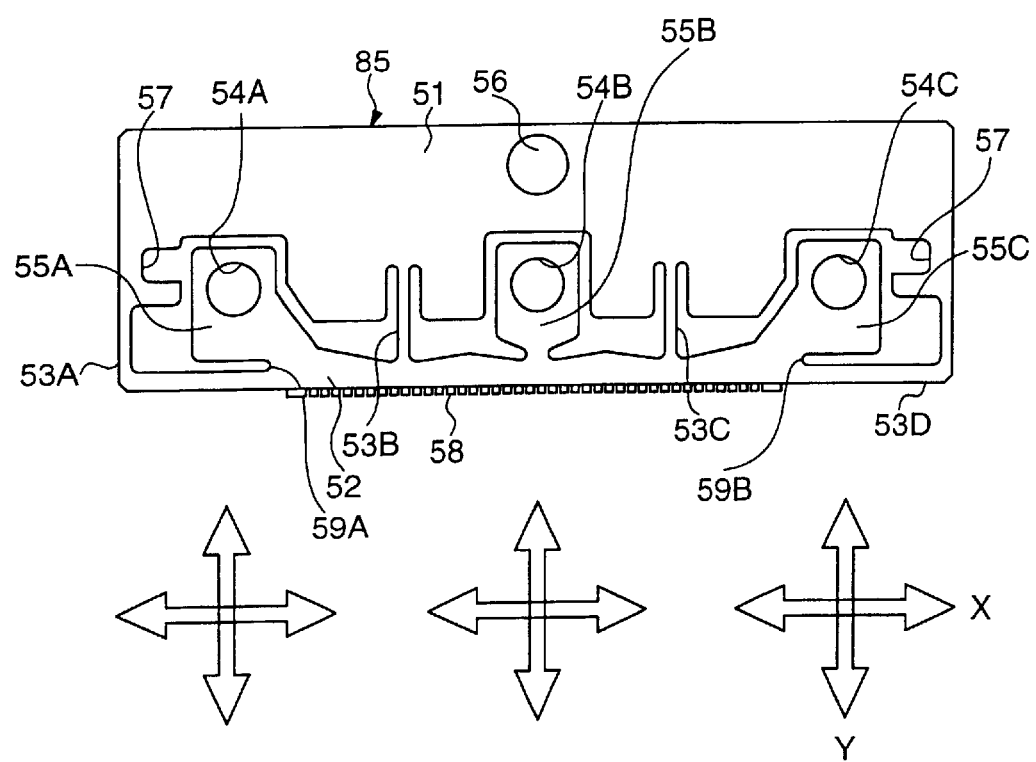
FIG. 8 is a front view showing still further another example of a tool which is used in the first embodiment of the apparatus for lapping magnetic heads.

Further, another example of a tool which may be used in the first embodiment of the present invention will be explained with reference to FIG. 8. Referring to FIG. 8, a tool 85 is different from the tool 75 of FIG. 6 regarding that the load applying portions 54A, 54B and 54C of the tool 85 are provided with round holes instead of the rectangular holes in the tool 75. Thus, the tool 85 is provided with the load applying portions 54A, 54B and 54C which can receive the loads of the two directions of the X-direction and Y-direction by using the round holes.

In the lapping apparatus 1 of FIGS. 1–4 provided with the tool 85 of FIG. 8, a plurality of loads applied to the three load applying portions 54A, 54B and 54C in the different directions can be combined. Therefore, the supporting portion 52 of the tool 85 can be deformed to have a complicated shape.

In the case of the lapping apparatus 1 of the first embodiment provided with the tool 85 of FIG. 8, the three load applying portions 54A, 54B and 54C are movable only in the two directions of the X-direction and Y-direction. As a result, the shafts 42A, 42B and 42C and the levers 41A, 41B and 41C for moving the three load applying portions 54A, 54B and 54C in the θ-direction may not be provided in the lapping apparatus 1 of FIGS. 1–4.

A second embodiment of the present invention will be explained with reference to FIGS. 9–27. In the lapping apparatus of the second embodiment, three load applying portions respectively have three degrees of freedom and are therefore movable in three directions of the X-direction, the Y-direction and the θ-direction, in the same way of the lapping apparatus 1 of the first embodiment explained above.

Figure 9:
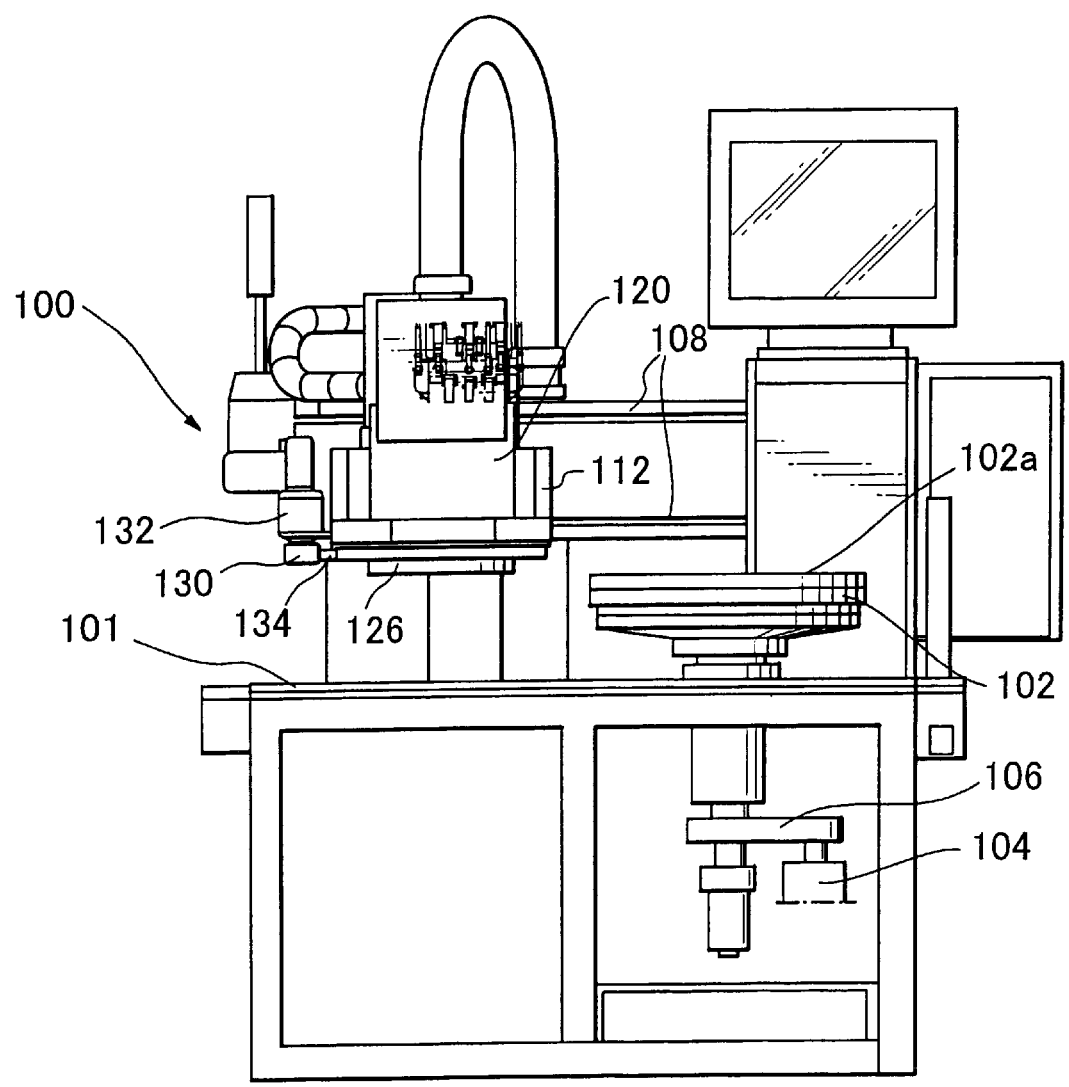
FIG. 9 is an overall front view showing an apparatus for lapping magnetic heads according to a second embodiment of the present invention.
Figure 10:
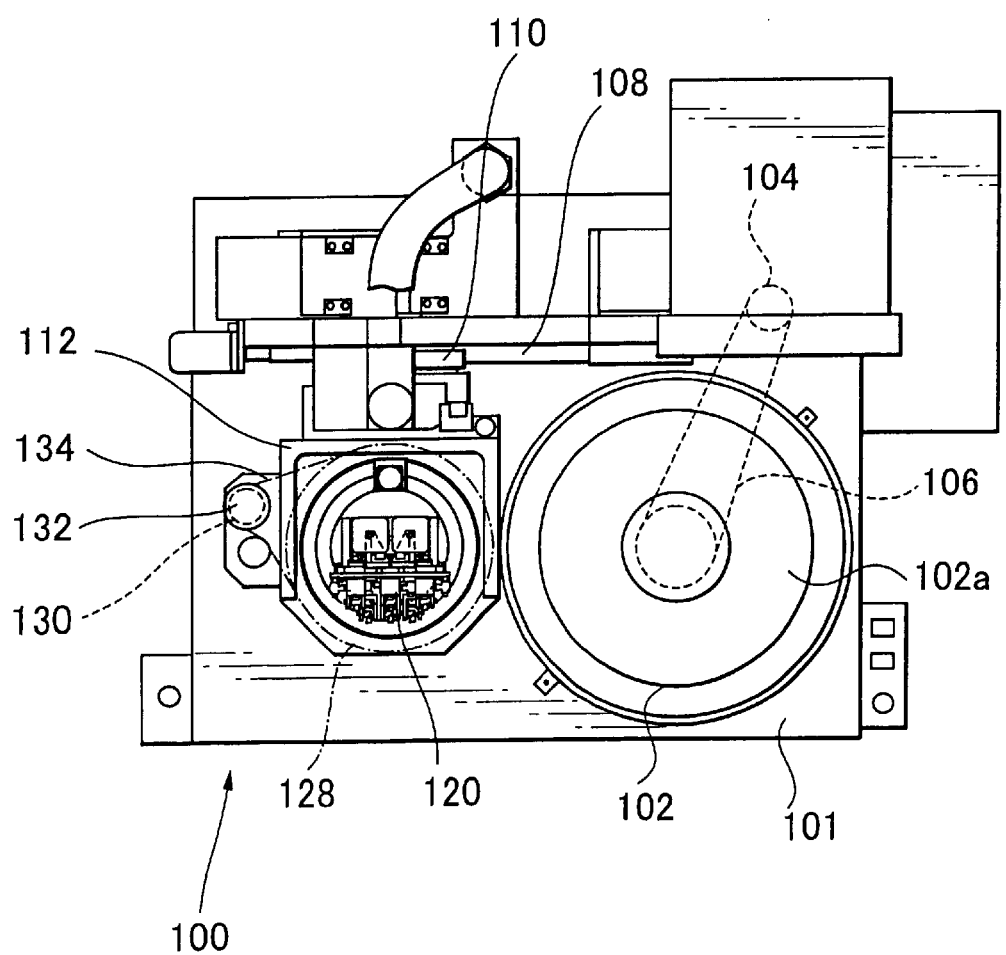
FIG. 10 is a plan view of FIG. 9.

FIG. 9 is an overall front view of an apparatus for lapping magnetic heads according to a second embodiment of the present invention, and FIG. 10 is a plan view of FIG. 9. An overall structure of an apparatus for lapping magnetic heads will be explained with reference to FIGS. 9 and 10.

A lapping apparatus 100 is provided with a base table 101. To the base table 101, a rotary lapping table 102 is rotatably supported within a horizontal plane and is driven by a motor 104 through a belt 106.

A pair of guide rails 108 are supported above the base table 101 so as to be vertically spaced each other and to be extended along the horizontal direction, and a slider 110 is provided so as to horizontally move along the guide rails 108. A frame 112 for attaching a lapping head is attached to the slider 110 to vertically move. That is, the height of the frame 112 can be controlled. The slider 110 is provided with a ball thread nut, which is engaged with a ball thread shaft, extending in parallel with the guide rails 108. When a motor rotates the ball thread shaft, the slider 110 moves along the guide rails 108. Further, the slider 110 and the lapping head attaching frame 112 can reciprocate along the rails 108.

Figure 11:
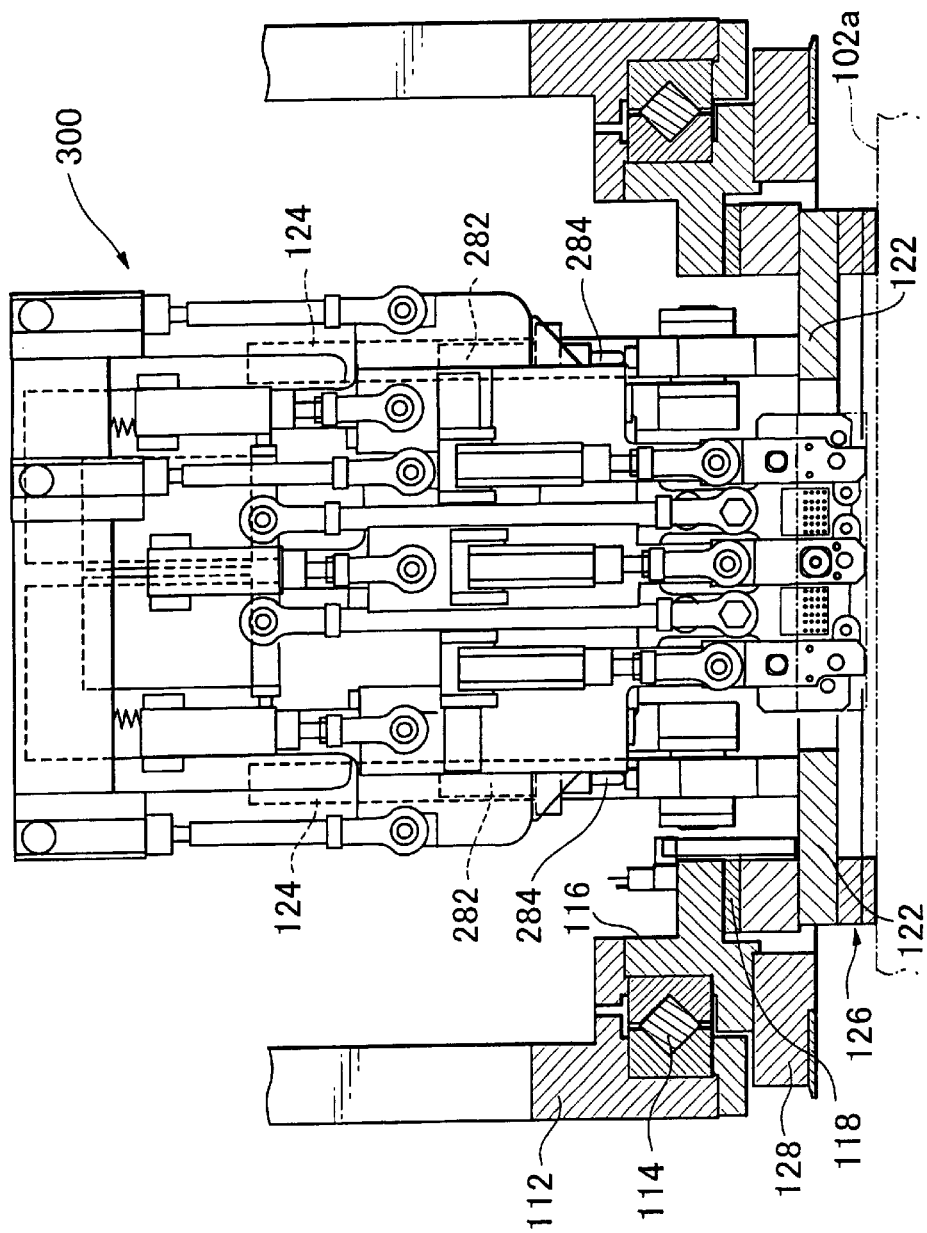
FIG. 11 is a front view showing a main portion of the apparatus for lapping magnetic heads of the second embodiment of the present invention.
Figure 12:
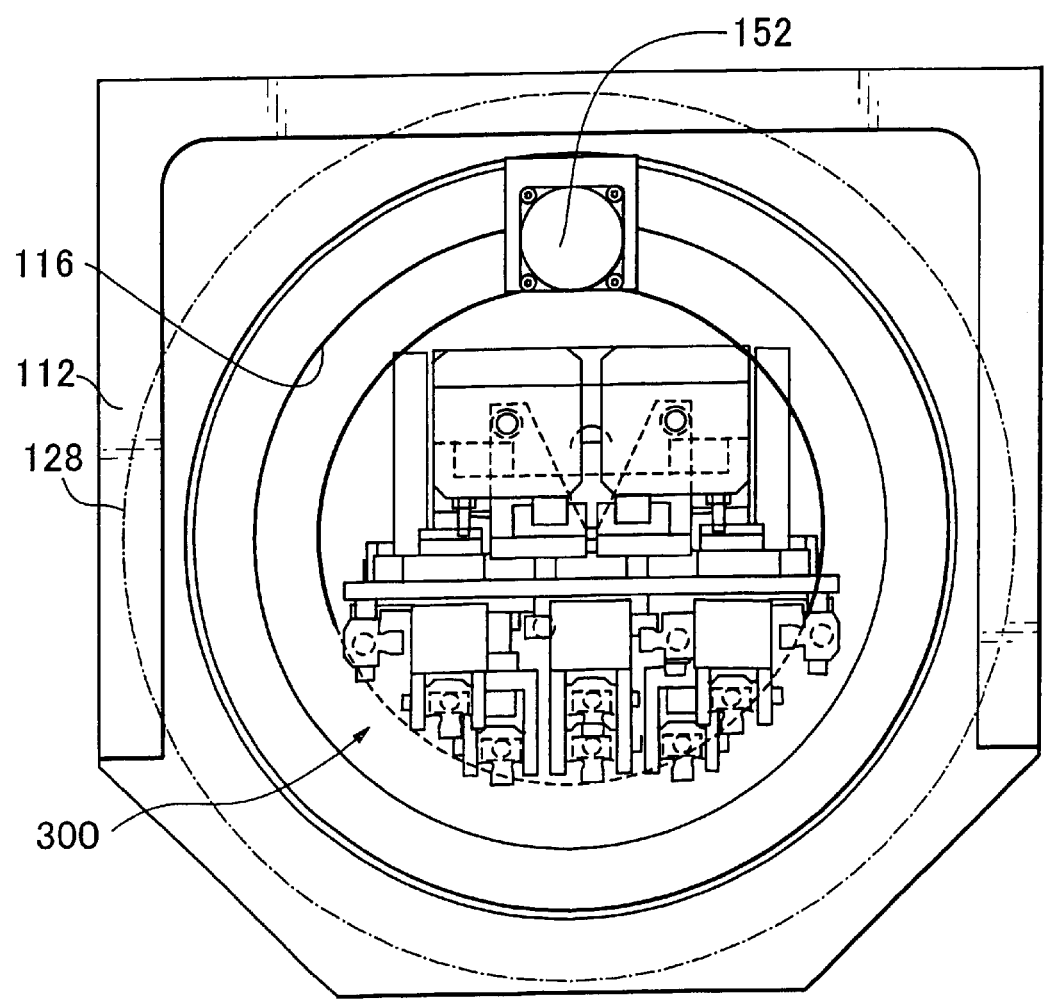
FIG. 12 is a plan view showing a main portion of the apparatus for lapping magnetic heads of the second embodiment of the present invention.

Referring to FIGS. 11 and 12, a rotation support 116 is rotatably supported by the inner side of the lapping head attachment frame 112 through a circular bearing 114. A lapping head 120 is attached to the rotation support 116 through a resilient member 118 such as a resilient plate or rubber. The lapping head 120 is provided with a bottom plate 122 and upright supporting plates 124, and an adjuster ring or wafer pad 126 is attached on the bottom surface of the bottom plate 122. The adjuster ring 126 is used so as to contact with an abrasive surface 102a of the rotary-lapping table 102. The adjuster ring 126 may be deleted from the lapping apparatus 100 of the second embodiment.

Referring to FIGS. 10 and 11, a belt wheel or pulley 128 is secured to the rotation support 116, and a motor 132 is installed outside of the frame 112 to rotate a belt wheel or pulley 130. A belt 134 is wound between the belt wheels 128 and 130. The motor 132, the belt wheels 128 and 130 and the belt 134 work as a rotating means for oscillating or rotating both the lapping head 120 and the adjuster ring 126 in a predetermined angular range.

Figure 13:
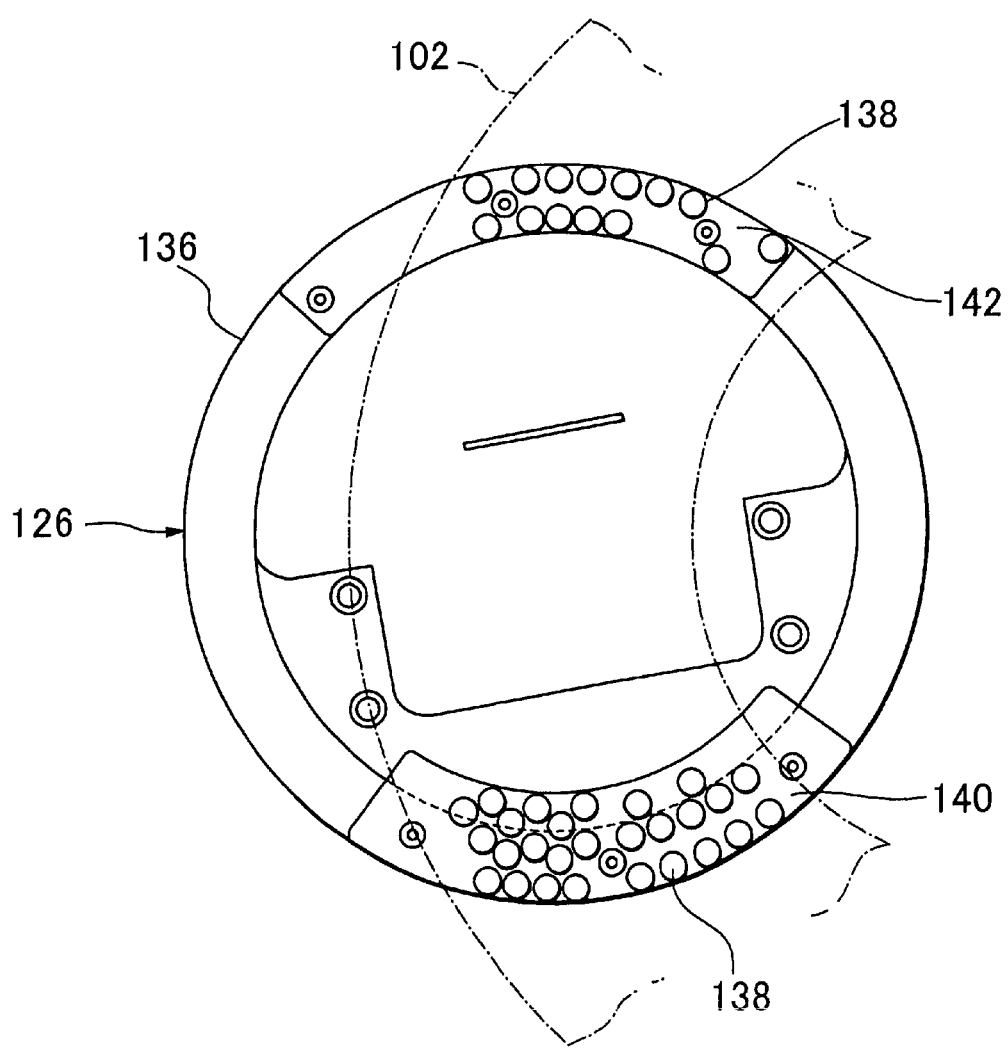
FIG. 13 is a bottom view showing an adjuster ring that is used in the second embodiment of the present invention.

FIG. 13 shows a bottom view of the adjuster ring 126. Referring to FIG. 13, the adjuster ring 126 includes an aluminum ring body 136 and a plurality of cylindrical abrasion resisting ceramic dummies 138 buried in the body 126, the lower ends of the dummies 138 slightly downwardly project from the body 126. The number of dummies 138 is determined based on a weight balance of the lapping head 120 disposed on the adjuster ring 126. In the case of the adjuster ring 126 shown in FIG. 13, more dummies 138 are buried in a circumference portion 140 than in a circumference portion 142, since the portion 140 supports more weight of the lapping head 120 than the portion 142.

A lapping device assembly 300 of the second embodiment will be explained with reference to FIGS. 14–27.

The lapping device assembly 300 of the lapping apparatus 100 comprises a tilting mechanism 302, a balance load drive mechanism 304, a X-direction drive mechanism 306, a Y-direction drive mechanism 308 and a θ-direction drive mechanism 310.

Figure 15:
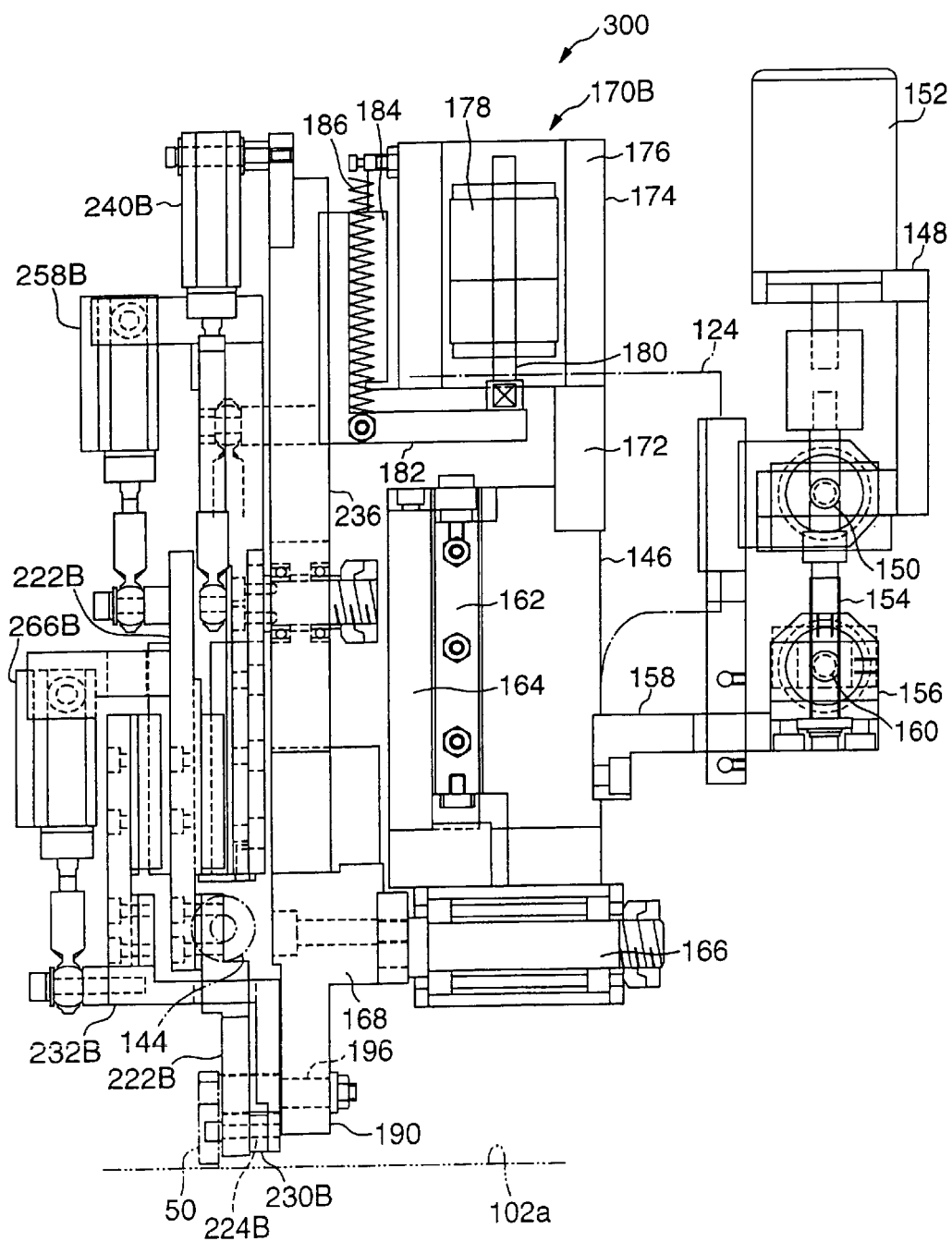
FIG. 15 is a partial sectional side view of FIG. 14.
Figure 16:
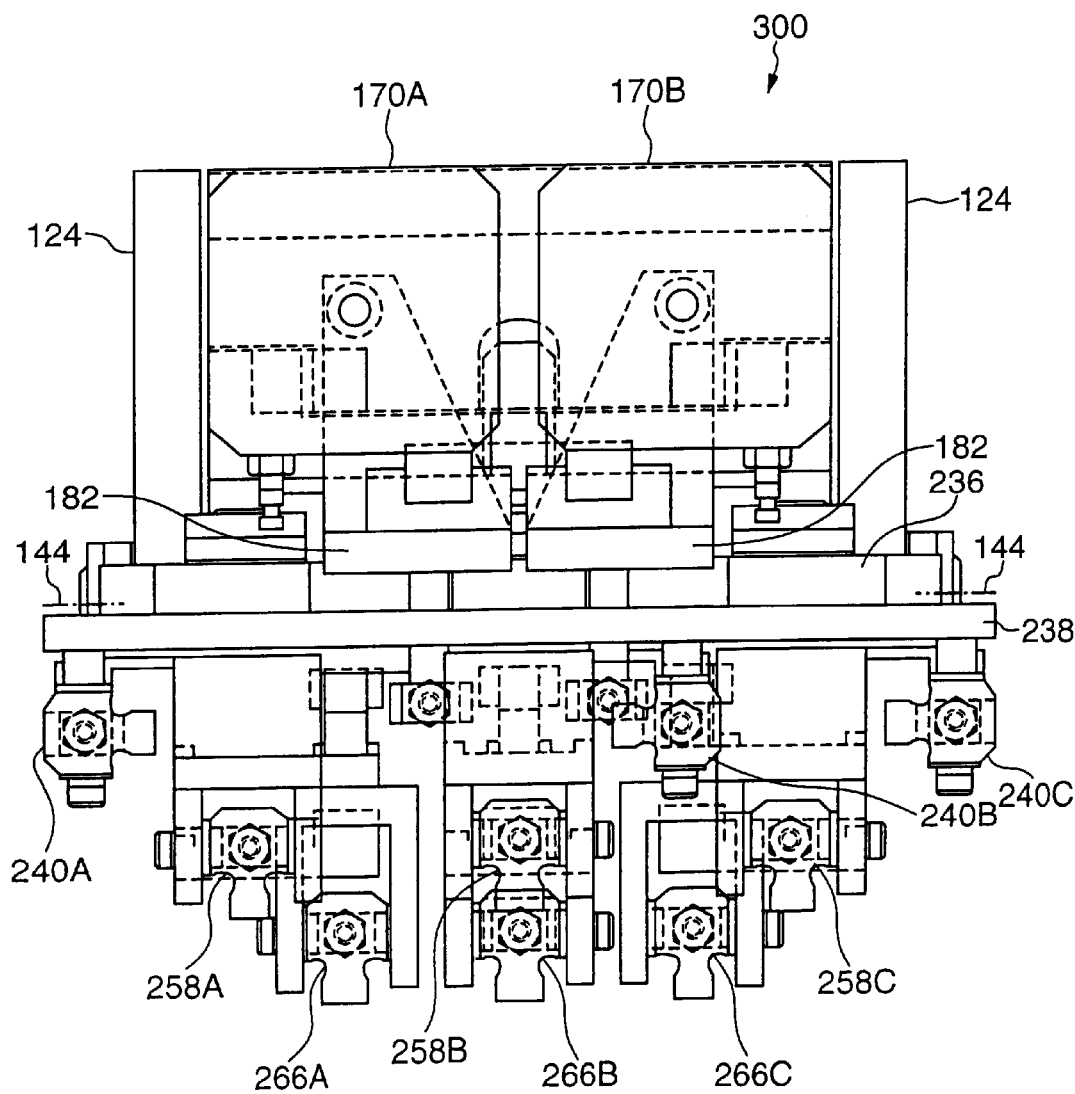
FIG. 16 is a plan view of FIG. 15.
Figure 17:
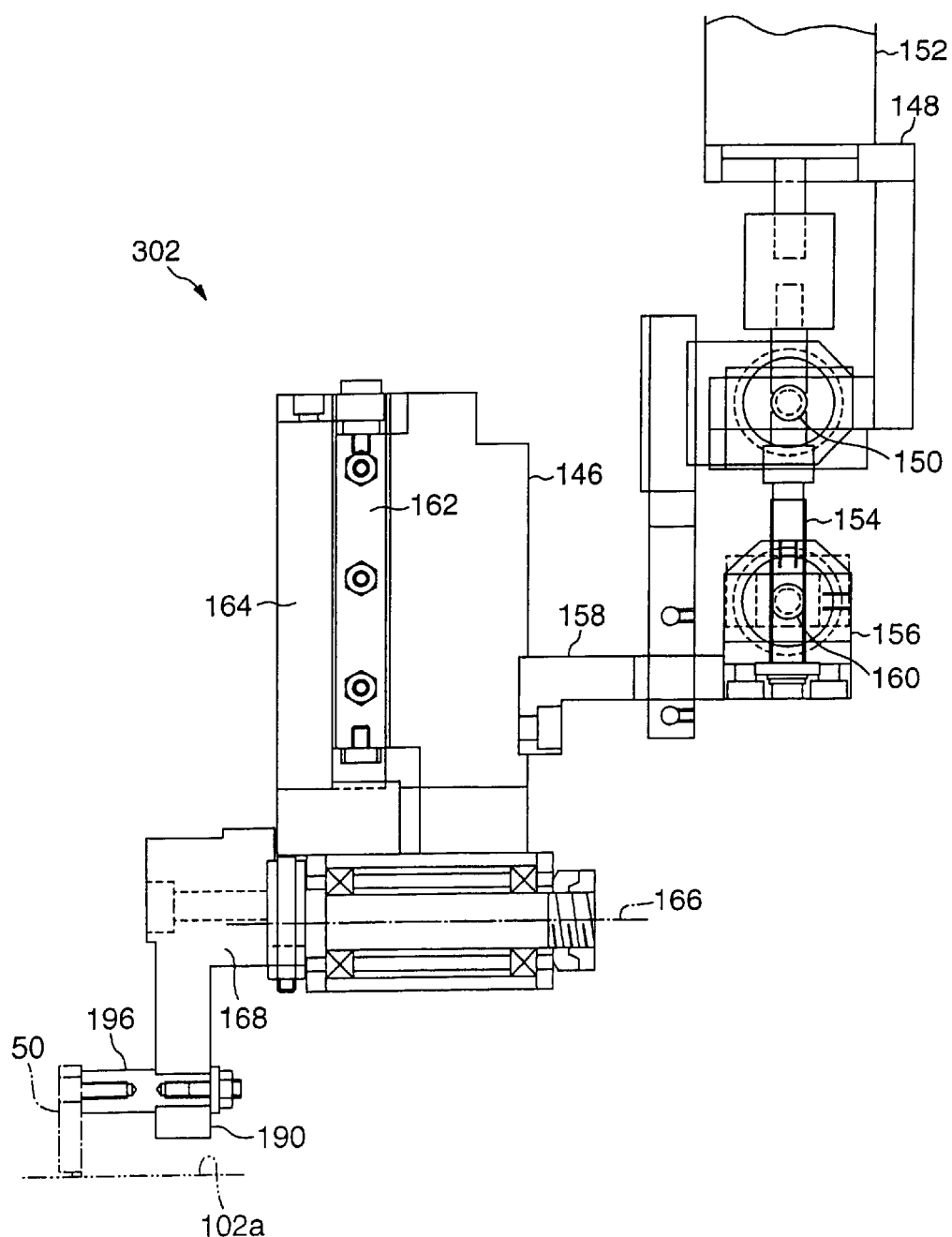
FIG. 17 is a side view showing a tilt assembly.
Figure 18:
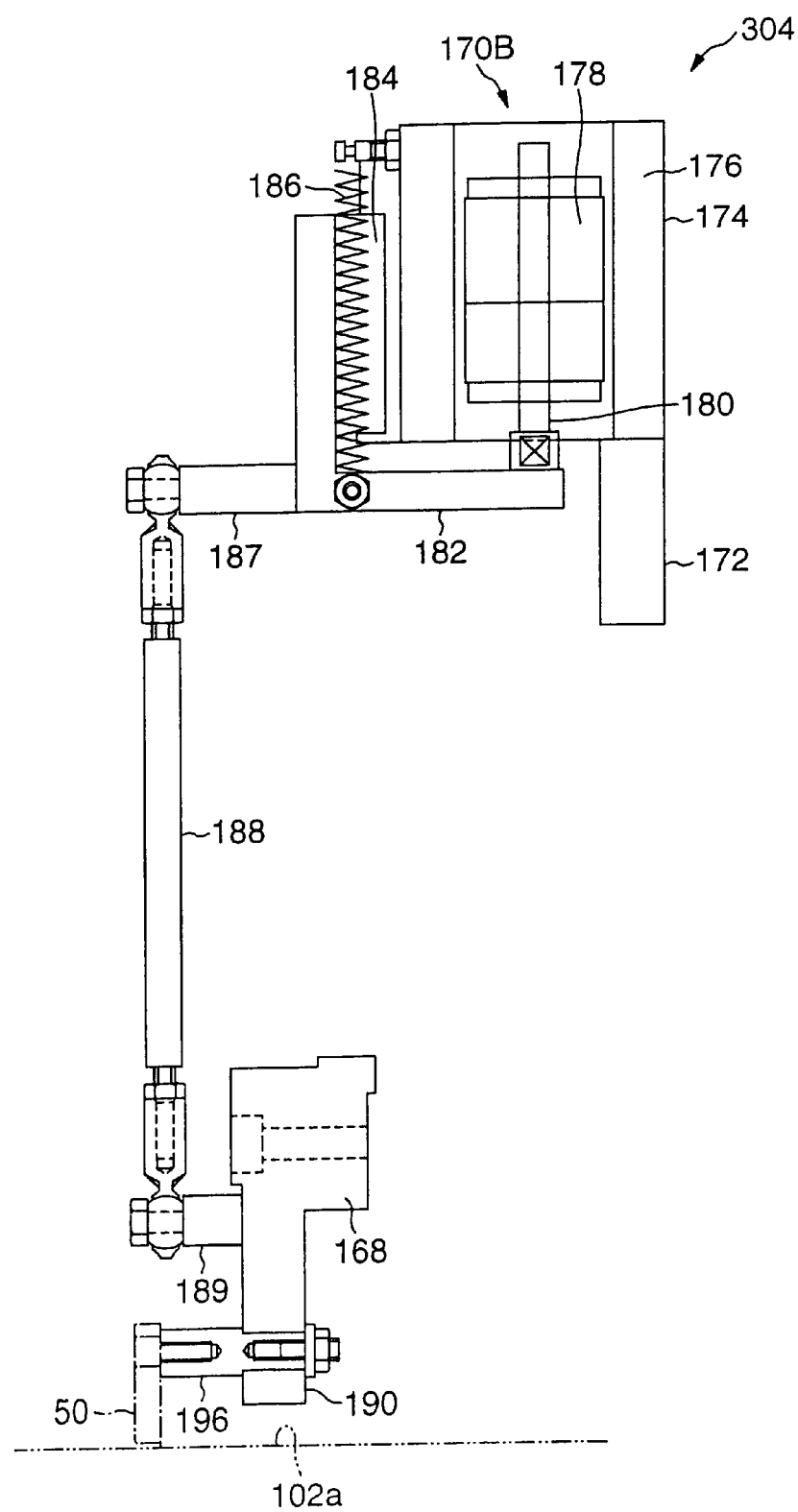
FIG. 18 is a side view showing a balancing load drive assembly.

The tilting mechanism 302 will be explained with reference to FIGS. 15 and 17. Referring to FIGS. 15 and 17, a tilt shaft 144 is fixed between the upright supporting plates 124 of the lapping head 120 so as to be parallel with the bottom surface of the adjuster ring 126, that is, the abrasive surface 102a of the lapping table 102. A tilting assembly 146 is secured to the tilt shaft 144 so as to tilt about the tilt shaft 144 with respect to the lapping head 120. The lower end of a motor attachment seat 148 is rotatably connected at a fulcrum shaft 150 with the upright supporting plates 124 of the lapping head 120, and a motor 152 for tilting the tilting assembly 146 is fixed on the upper end of the motor attachment seat 148. The driving shaft of the motor 152 is connected with a ball thread shaft 154 with which a ball thread nut 156 is engaged. The one end of an arm 158 is connected at a fulcrum shaft 160 with the ball thread nut 156, and other end of the arm 158 is connected with the tilt assembly 146. These components 150–160 work as a tilting means for tilting the tilting assembly 146 by a predetermined angle from the position of the tilting assembly 146 being vertical to the abrasive surface 102a of the lapping table 102.

A slider 164 is attached with the tilt assembly 146 through a linear guide 162 so as to move up and down. The slider 164 is tilted together with the tilt assembly 146, and therefore both the slider 164 and the tilt assembly 146 can be always kept in parallel condition. A back plate 168 is attached to the lower end of the slider 64 so as to pivot on a fulcrum shaft 166 which is parallel with the abrasive surface 102a of the lapping table 102 and is perpendicular to the tilt shaft 144.

The balance load drive mechanism 304 will be explained with reference to FIGS. 14–16 and 18. Referring to FIGS. 14–16 and 18, a pair of magnetic actuators 170A and 170B for balance correction are attached to the upper portion of the tilt assembly 146 through brackets 172. These magnetic actuators 170A and 170B are provided to push downwardly the right and left sides of the back plate 168 with respect to the fulcrum shaft 166 and to control the load applied on the back plate 168. The magnetic actuators 170A and 170B for balance correction are respectively provided with frames 174, coils 176 attached to the insides of the frames 174, magnets 178 installed at the centers of the frames 174 and rods 180 integrally connected with the centers of the magnets 178. The frames 174 and the coils 176 are stationary, and the magnets 178 and the rods 180 are movable.

The lower ends of the rods 180 of the actuators 170A and 170B are respectively connected with lift members 182 whose cross sections have L-letter shapes and which are movable up and down along linear guides 184 fixed to the frames 174 of the actuators 170A and 170B. Spring members 186 respectively connect the upper portions of the frames 174 with the sliders 182 so that the biasing forces of the spring members 186 can cancel the weights of the movable magnets 178. The lower portions of the sliders 182 are respectively connected with the right side and the left side of the back plate 168 through connecting links 188. Pivotal points on the back plate 168 of the right and left connecting links 188 are indicated as R and L in FIG. 14. Thus, the moving directions of the magnets 178 of the magnetic actuators 170A and 170B for balance correction are substantially parallel to the directions of the pushing pressures or forces applied to the back plate 168. If the total weight of the lifting potion including the slider 164, the back plate 168 and the like are relatively large, the magnetic actuators 170A and 170B for balance correction are operated so as to pull up the lifting portion.

Figure 14:
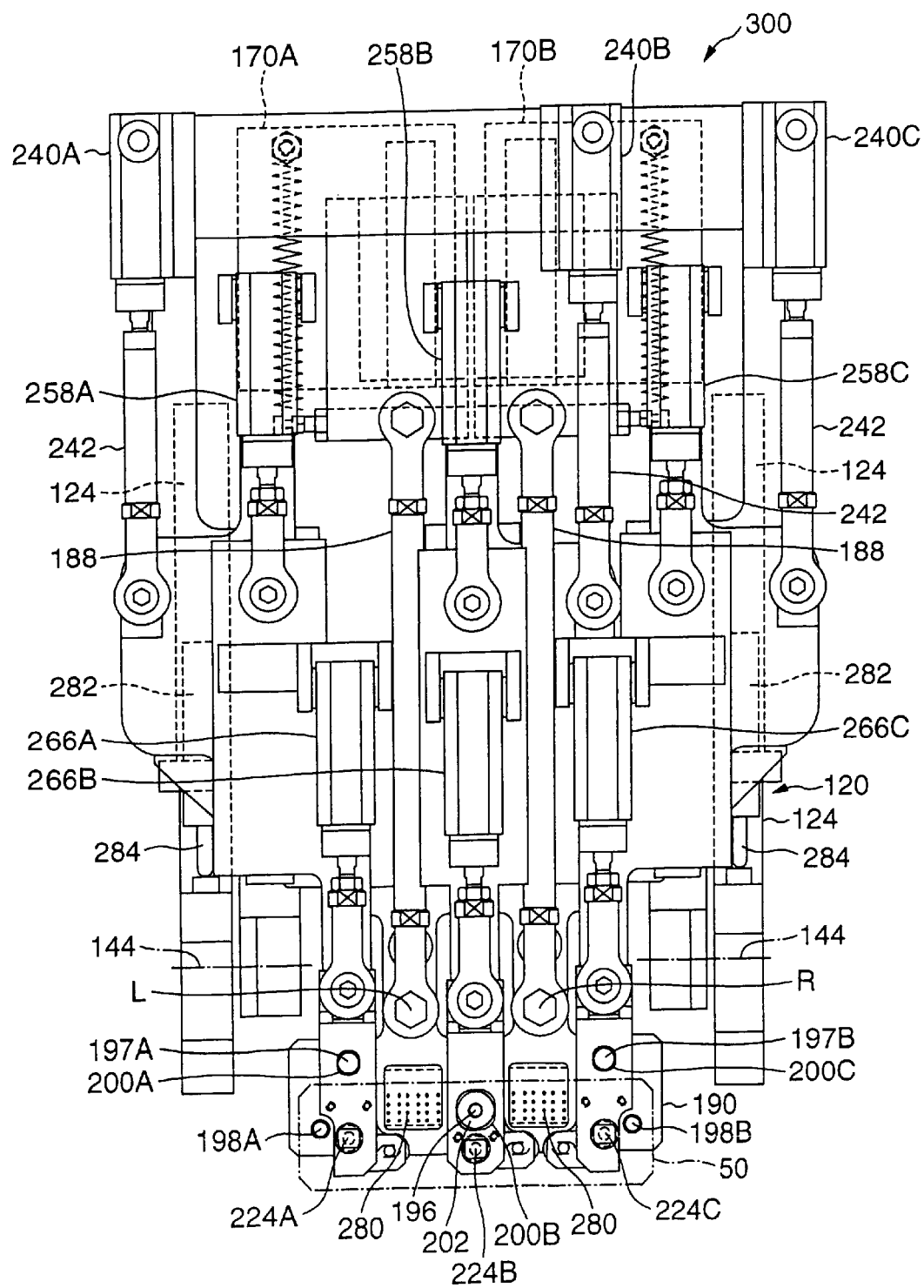
FIG. 14 is a front view showing a lapping device assembly of the second embodiment of the present invention.

Next, how to attach the tool to the lapping apparatus 100 will be explained with reference to FIGS. 14 and 15. The tool 50 of FIG. 5, the tool 75 of FIG. 6, the tool 80 of FIG. 7 and the tool 85 of FIG. 8 are respectively may be applied to the lapping apparatus 100 of the second embodiment of the present invention.

Here, the lapping apparatus 100 provided with the tool 50 of FIG. 5 will be explained. Referring to FIGS. 14 and 15, the back plate 168 includes a lower end portion 190, which likes a rectangular plate. On the front side of the lower end portion 190 of the back plate 168, there is integrally provided with a tool fixing pin 196 on the center, two stopper pins 197A and 197B at right and left sides and guide pins 198A and 198B at both ends portions. A bolt 202 is threadedly engaged with the front portion of the tool-fixing pin 196 such that the tool 50 is supported at only one point by the lower end portion 190 of the back plate 168.

The stopper pins 197A and 197B and the tool fixing pin 196 work as positioning pins, when correction holders 222A, 222B and 222C which will be explained below are attached to the lower end portion 190 of the back plate 168. The stopper pins 197A and 197B and the tool fixing pin 196 have diameters which are respectively smaller by predetermined lengths than those of through holes 200A, 200B and 200C provided in the correction holders 222A, 222B and 222C for bow correction. As a result, the stopper pins 197A and 197B also work so as to stop the undesirable movements of the correction holders 222A, 222B and 222C for bow correction when the correction holders 222A, 222B and 222C undesirably move up and down. The guide pins 198A and 198B work so as to position the tool 50 when the tool 50 is attached to the lower end portion 190 of the back plate 168 through the correction holders 222A, 222B and 222C.

Referring to FIGS. 14, 15, 25 and 26, bearings 226 are respectively provided near the lower ends of the respective correction holders 222A, 222B and 222C. The load applying pins 224A, 224B and 224C are rotatably inserted into the bearings 226. The load applying pins 224A, 224B and 224C are provided with rectangular head portions 228A, 228B and 228C at the front end thereof, and these head portions 228A, 228B and 228C are respectively engaged with the holes of the load applying portions 54A, 54B and 54C of the tool 50.

On the other hand, the rear ends of the load applying pins 224A, 224B and 224C are respectively connected to one end portions of levers 230A, 230B and 230C. The other end portions of the levers 230A, 230B and 230C are respectively connected to the lower end portions of θ-direction holders 232A, 232B and 232C through pins 234 so as to oscillate.

The θ-direction holders 232A, 232B and 232C are provided to oscillate the levers 230A, 230B and 230C.

Figure 19:
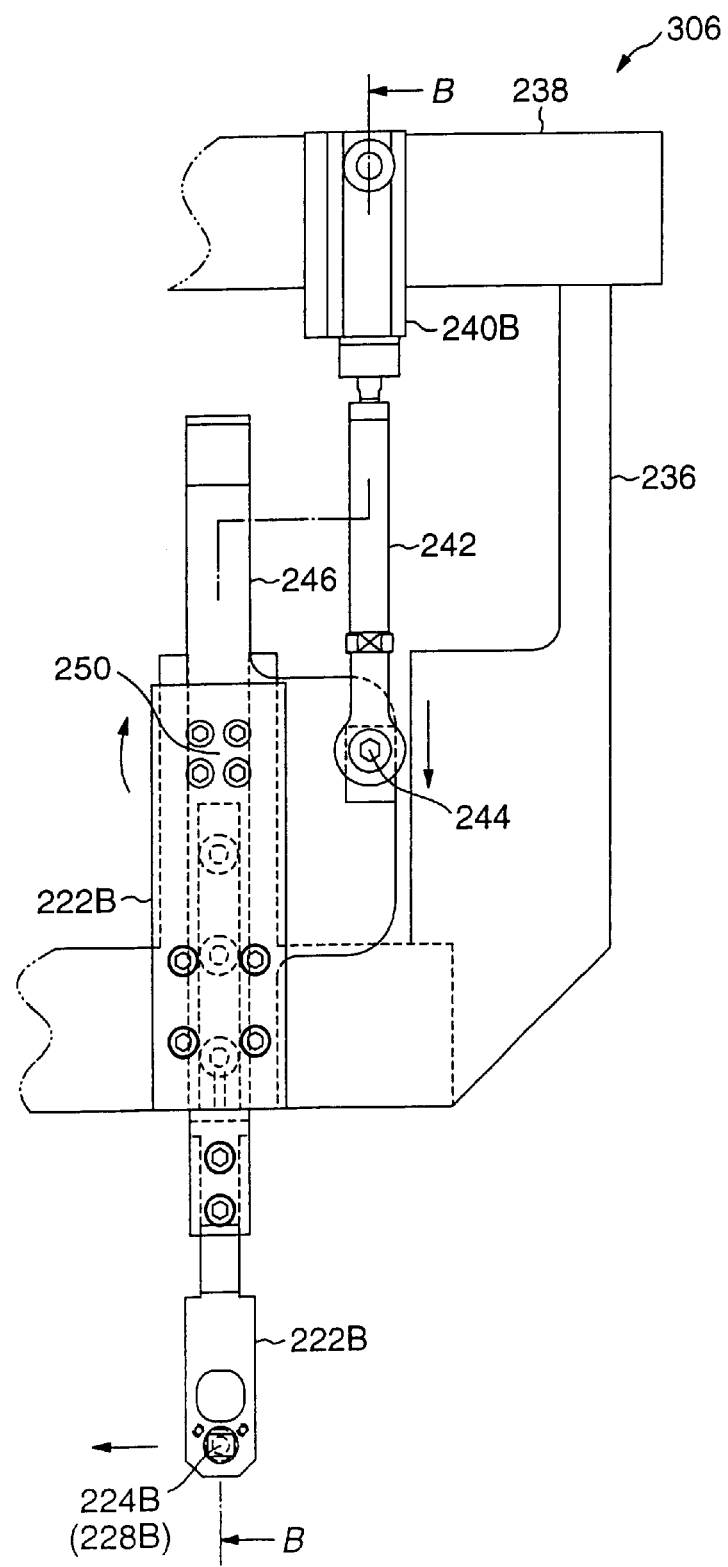
FIG. 19 is a front view showing an X-direction drive assembly.
Figure 20:
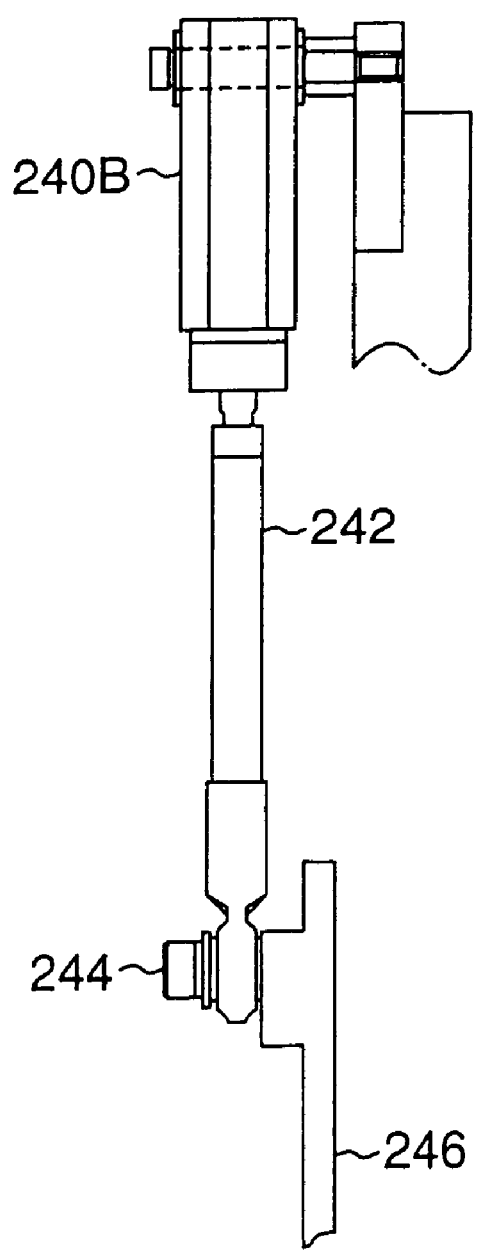
FIG. 20 is a partial side view of FIG. 19.
Figure 21:
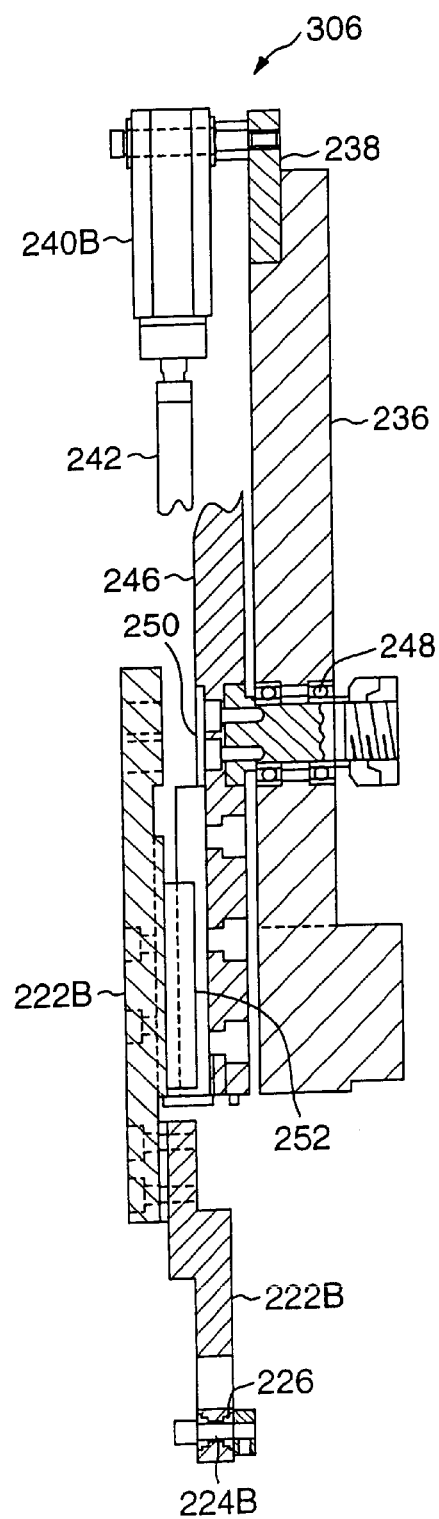
FIG. 21 is a sectional side view taken along a B—B line of FIG. 19.

Next, the X-direction drive mechanism 306 will be explained with reference to FIGS. 19–21. FIGS. 19–21 shows a mechanism for applying a load in the X-direction to the load-applying pin 224B as a typical example of the X-direction drive mechanism 306. A main holder 236 is fixed to the upper portion of the back plate 168 (see FIG. 15), and an upper holder 238 is fixed to the upper end portion of the main holder 236. X-direction drive actuator 240B (240A and 240C) for applying a load in the X-direction to the load applying pin 224B (224A and 224C) is attached to the upper holder 238.

The upper end of a rod 242 is connected to the lower end of the X-direction drive actuator 240B, and a rotating plate 246 is connected to the lower end of the rod 242. The rotating plate 246 is provided so as to move up and down through an axis 244 and rotate about an axis 250 disposed in the main holder 236 through a bearing 248. A linear guide 252 is fixed to the front side surface (the left side surface in FIG. 21) of the rotating plate 246. The correction holder 222B is attached to the linear guide 252 so as to slide in an up and down direction. The load-applying pin 224B is rotatably attached through a bearing 226 to the lower end portion of the correction holder 222B.

When, in the X-direction drive mechanism 306, the X-direction drive actuator 240B is driven and the rod 242 is moved downwardly (or upwardly), the axis 244 is also moved downwardly (or upwardly) and the rotating plate 226 is rotated clockwise (or counterclockwise) about the axis 250 as shown in FIG. 19. At the same time, the correction holder 222B is rotated clockwise (or counterclockwise) together with the rotating plate 226, and the load supplying pin 224B is finally moved in the left direction (or the right direction).

Figure 22:
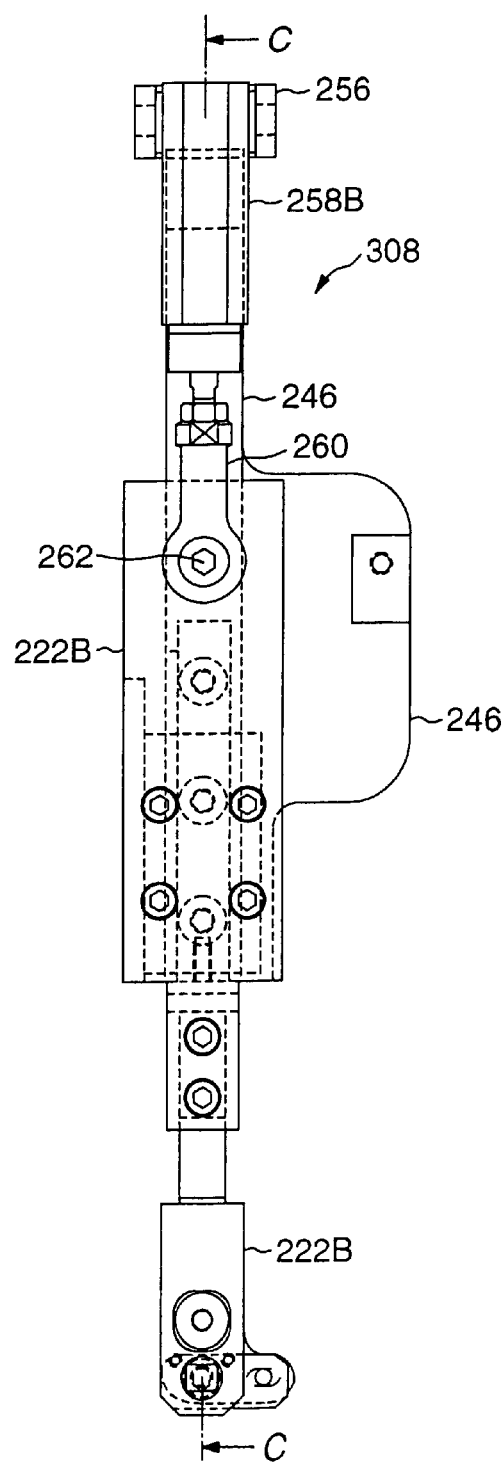
FIG. 22 is a front view showing a Y-direction drive assembly.
Figure 23:
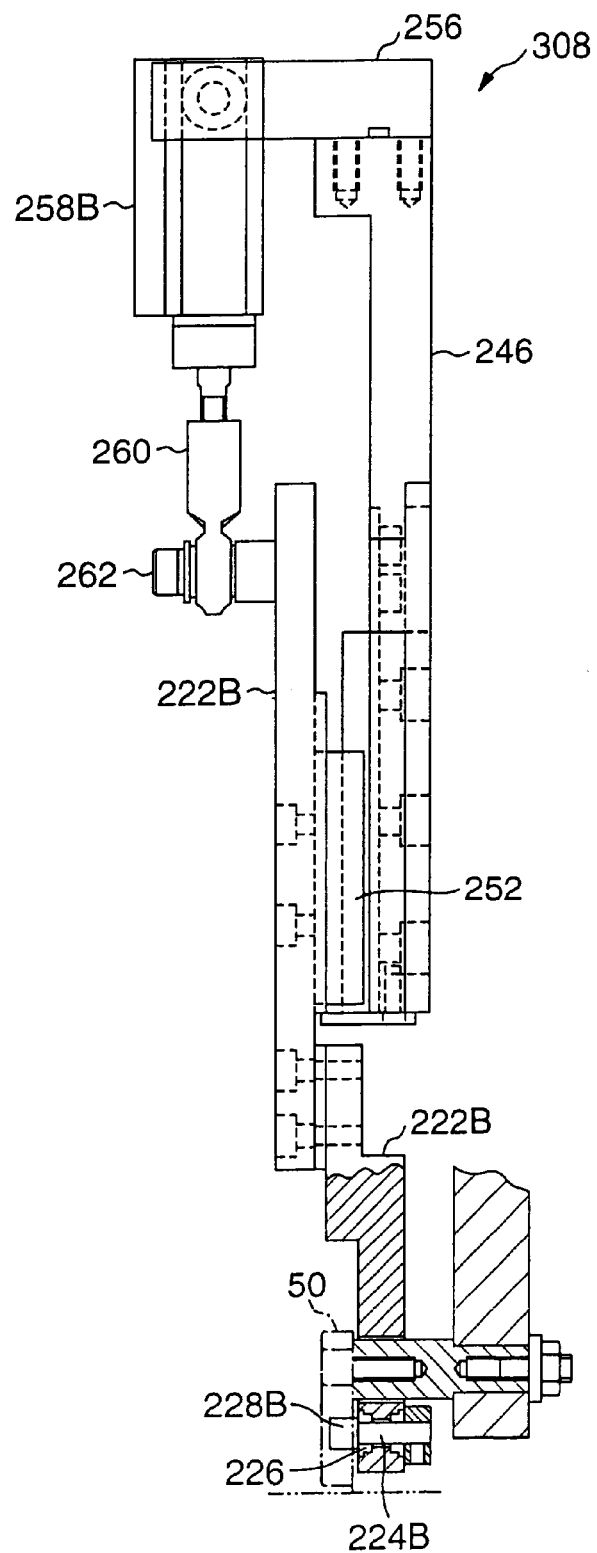
FIG. 23 is a sectional side view taken along a C—C line of FIG. 22.

The Y-direction drive mechanism 308 will be explained with reference to FIGS. 22 and 23. FIGS. 22 and 23 shows a mechanism for applying a load in the Y-direction to the load applying pin 224B as a typical example of the Y-direction drive mechanism 308. Y-direction drive actuator 258B (258A and 258C) for applying a load through a bracket 256 in the Y-direction to the load applying pin 224B (224A and 224C) is attached to the upper end portion of the rotating plate 246. The upper end of a rod 260 is connected to the lower end of the Y-direction drive actuator 258B, and the correction holder 222B is connected through an axis 262 to the lower end of the rod 260. The correction holder 222B is rotatable about the axis 262, and the holder 222B is further rotatable about the axis 250 (see FIGS. 19 and 21) by the X-direction drive actuator 240B and movable in the Y-direction (or the up and down direction) by the Y-direction drive actuator 258B. As a result, the loads of the both X-direction and Y-direction are applied to the load applying pin 224B by the correction holder 222B.

Figure 24:
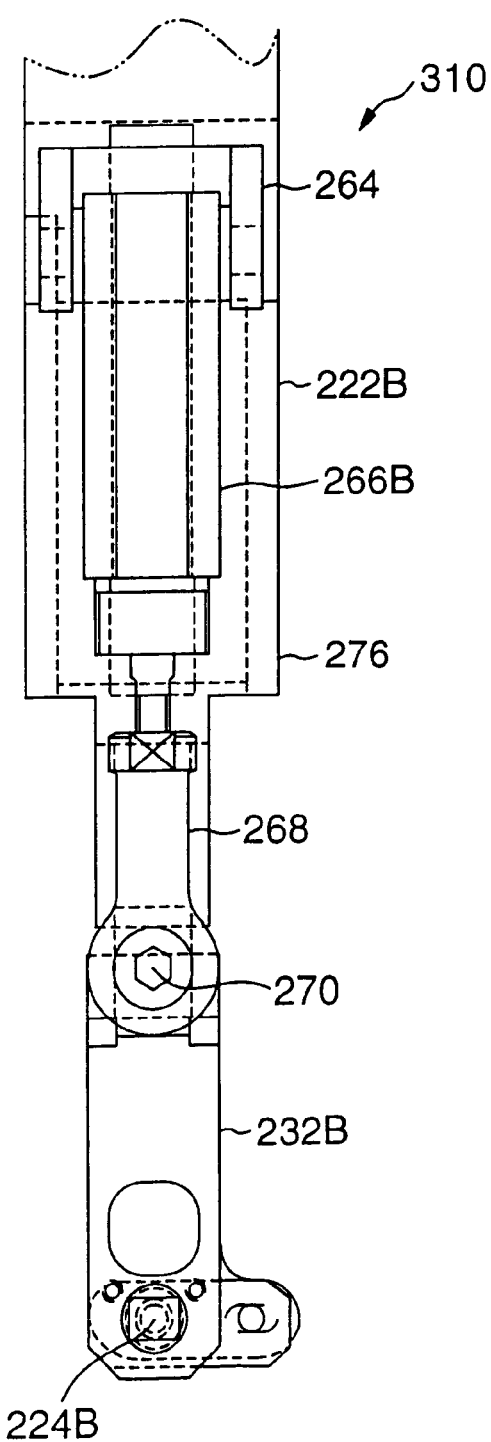
FIG. 24 is a front view showing a θ-direction drive assembly.
Figure 25:
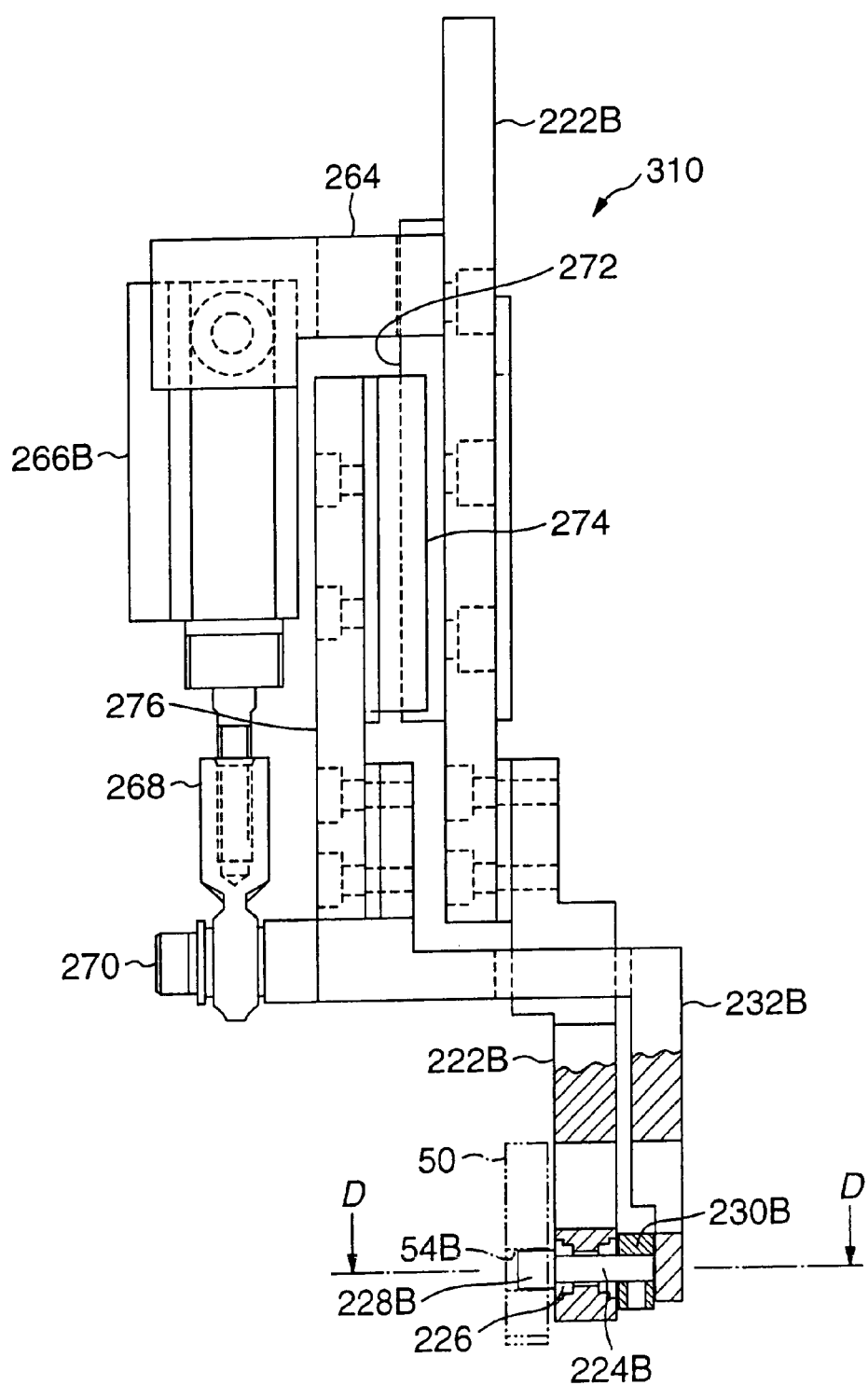
FIG. 25 is a partial sectional side view of FIG. 24.
Figure 26:
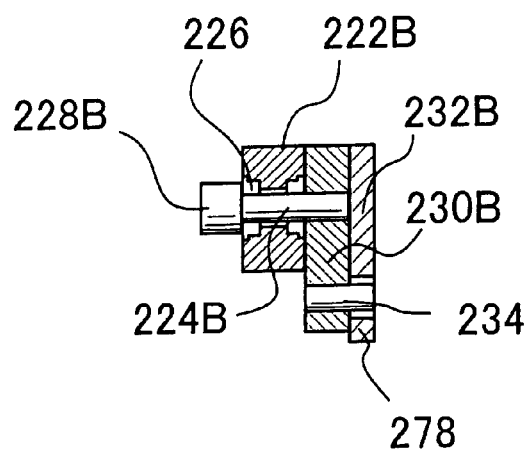
FIG. 26 is a sectional plan view taken along a D—D line of FIG. 25.

The θ-direction drive mechanism 310 will be explained with reference to FIGS. 24–26. FIGS. 24–26 shows a mechanism for applying a load in the θ-direction to the load applying pin 224B as a typical example of the Y-direction drive mechanism 310. θ-direction drive actuator 266B (266A and 266C) for applying a load in the θ-direction to the load applying pin 224B (224A and 224C) is attached through a bracket 264 to the front side surface (the left side in FIG. 25) the upper portion of the correction holder 222B.

The upper end of a rod 268 is connected to the lower end of the θ-direction drive actuator 266B, and the θ-direction holder 232B is connected through an axis 270 to the lower end of the rod 268 so that the θ-direction correction holder 232B is rotatable about the axis 270. A linear guide 274 is fixed through a plate 272 to the front side surface of the correction holder 222B. A θ-direction slider 276 is disposed on the linear guide 274 so as to slide in an up and down direction. The θ-direction holder 232B is fixed integrally to the lower end portion of the θ-direction slider 276. A transversely projecting portion 278 is integrally formed on the lower end portion of the θ-direction holder 232B, and the lever 230B is connected through a pin 234 to the transversely projecting portion 278 so as to oscillate about the pin 234. As mentioned above, the other end portion of the lever 230B is connected to the load applying pin 224B.

When, in the θ-direction drive mechanism 310, the θ-direction drive actuator 266B is driven and the rod 268 is moved downwardly (or upwardly), the axis 270 is also moved downwardly (or upwardly) and the θ-direction slider 276 is moved downwardly (or upwardly) being guided by the linear guide 274. At the same time, the θ-direction holder 232B is moved downwardly (or upwardly) and the pin is therefore moved downwardly (or upwardly) and the lever 230B is rotated clockwise about the load applying pin 224B. As a result, the θ-direction load is applied to the load applying pin 224B.

Next, other structures of the second embodiment of the present invention will be explained below.

The lapping process is carried out in order to obtain optimum values of the throat heights of the respective transducers of the magnetic heads arranged on the longitudinal side surface 70a of the ceramic bar or the workpiece 70, while the electric resistances, which correspond to the throat heights, of the transducers located on the right, left and center of the ceramic bar 70 are measured in a predetermined cycle. Namely, electrodes connected to the transducers are provided on the back surface of the tool 50 facing the lower end portion of the back plate 168, and the electrodes on the tool 50 are connected with measuring pins 280 (see FIG. 14) planted in the lower end portion 190. The measuring pins 280 are connected with a device (not shown) for measuring electric resistances.

Further, referring to FIG. 11, contact-type sensors 282 for detecting vertical positions of the right and left ends of the tool 50 attached to the lower end portion 190 of the back plate 168 are attached with the both right and left ends of the back plate 168. The attachment positions of the contact-type sensors 282 substantially corresponds to those of the right and left ends of the tool 50. The lower end of the contact of the sensor 282 contacts with a convex surface provided on the upright supporting plate 124 of the lapping head 120. The contact-type sensor 282 generates electrostatic capacity, which is proportional to the projection amount of the contact. However, other types of the sensors may be employed in the present invention. Thus, the two sensors 282 detect the heights of the right and left end portions of the tool 50, and as a result the lapped amount and the balance of the right and left are detected.

An operation of the lapping apparatus 100 of the second embodiment of the present invention will be explained below.

The tool 50 supporting the bar or workpiece with a plurality of magnetic heads is attached to the lower end portion 190 of the back plate 168, when the lapping head 120 is located outside of the lapping table 102. Further, the tilting angle of the back plate 168 to the lapping head 120 is set zero at the beginning, that is, the back plate 168 is set to be vertical to the bottom surface of the adjuster ring 126.

Thereafter, the lapping head attaching frame 112 to which the lapping head 120 is attached is linearly moved along the guide rails 108 to the location above the rotary lapping table 102, and the frame 112 is moved downwardly so that the adjuster ring 126 contacts to the abrasive surface 102a of the lapping table 102 with a desirable pushing pressure. Thus, the attitude of the lapping head 120 on the adjuster ring 126 can be controlled based on the abrasive surface 102a of the lapping table 102. As a result, the tilting assembly 146, the lower end portion 190 of the back plate 168 and the tool 50 attached to the lower end portion 190 are set so as to be vertical to the abrasive surface 102a of the lapping table 102.

Then, the pushing pressures or forces are applied to the both right and left sides of the fulcrum shaft 166 on which the lower end portion 190 of the back plate 168 pivots by the magnetic actuators 170A and 170B for balance correction so that the moving directions of the movable portions of the actuators 170A and 170B are substantially parallel with the directions of the pushing pressures or forces. The magnetic actuators 170A and 170B for balance correction work so as to equalize the lapped amounts of the right and left sides of the bar or workpiece 70 by controlling the pushing pressures or forces applied to the right and left sides of the bar or workpiece 70 and so as to push out the bar or workpiece 70 toward the abrasive surface 102a of the lapping table 102.

Under this condition, the X-direction drive actuators 240A and 240C of the X-direction drive mechanism 306 is driven, the rod 242 and the axis 244 is moved downwardly (or upwardly), the rotating plate 226 is rotated clockwise (or counterclockwise) about the axis 250 as shown in FIG. 19, and the load applying pins 224A and 224C are finally moved in the left direction (or the right direction) in a predetermined distance. Thus, the load of the X-direction, that is, the horizontal direction can be applied to the load applying portions 54A and 54C of the tool 50.

Further, the Y-direction drive actuators 258A, 258B and 258C of the Y-direction drive mechanism 308 is driven, the rod 260 and the axis 262 is moved downwardly (or upwardly), the correction holders 222A, 222B and 222C are moved in the Y-direction, that is, the vertical direction, and the load applying pins 224A, 224B and 224C are finally moved in the up direction (or the down direction) in a predetermined distance. Thus, the load of the Y-direction, that is, the vertical direction can be applied to the load applying portions 54A, 54B and 54C of the tool 50.

Further, the θ-direction drive actuators 266A and 266C of the θ-direction drive mechanism 310 is driven, the rod 268 and the axis 270 is moved downwardly (or upwardly), the θ-direction slider 276 is moved downwardly (or upwardly) being guided by the linear guide 274, the θ-direction holders 232A and 232C are moved downwardly (or upwardly), the pin 234 is moved downwardly (or upwardly), and the load applying pins 224A and 224C are finally rotated clockwise by the levers 230A and 230C. Thus, the load of the θ-direction can be applied to the load applying portions 54A and 54C of the tool 50.

As mentioned above, when the loads are applied from a plurality of different directions to the load applying portions 54A, 54B and 54C of the tool 50, the supporting portion 52, the bar fixing portion 58 and the bar 70 are all deformed. Under these conditions, a first lapping process is carried out so as to obtain desirable throat heights of the transducers, which are provided on the longitudinal side surface 70a of the bar 70, of the thin film magnetic heads of the bar or workpiece 70.

Further, the adjuster ring 126 is worn at the same portions thereof if the same portions of the adjuster ring 126 continuously contact with the abrasive surface 102a of the lapping table 102. Therefore, during the first lapping process, the rotation support 116 together with the lapping head 120 and the adjuster ring 126 are rotated or oscillated in a predetermined angular range by the motor 132, and at the same time the lapping head attachment frame 112 are reciprocated in a predetermined distance. Thus, during the first lapping process, the lapping head 120 and the adjuster ring 126 have a movement of the combination of rotation and reciprocation.

The respective transducers of the thin film magnetic heads are arranged on the longitudinal side surface 70a of the ceramic bar or workpiece 70. The throat heights of the transducers can be detected by measuring the electric resistances of the transducers. Therefore, the first lapping process is carried out while the electric resistances of the transducers are measured in cycles so that the respective throat heights in the magnetic heads are set to have equal and optimum values.

Figure 27:
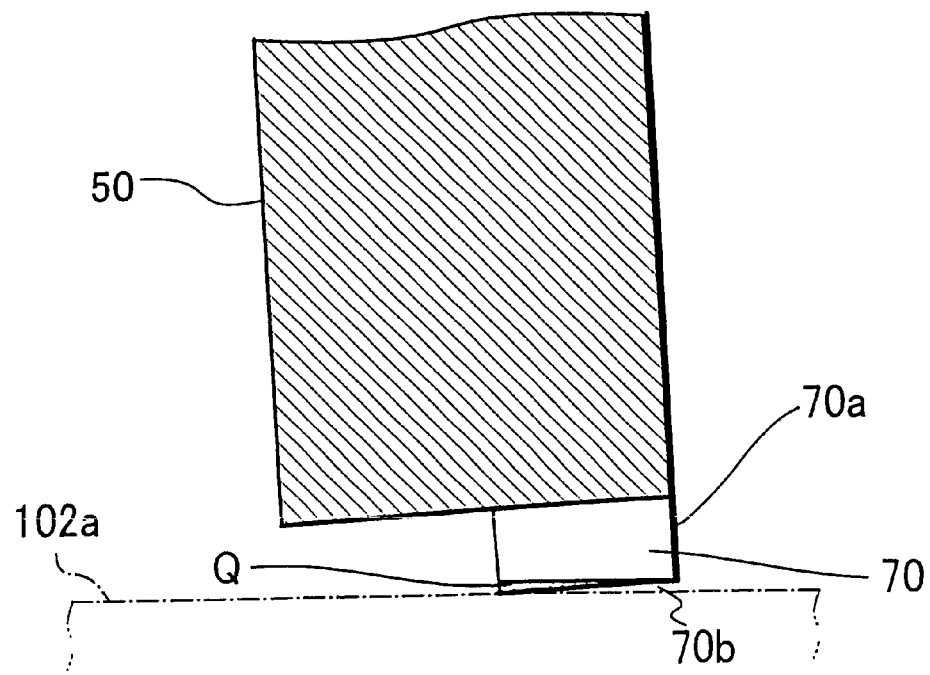
FIG. 27 is a partial sectional side view of a workpiece for explaining a tapering process according to the second embodiment of the present invention.
Figure 28:
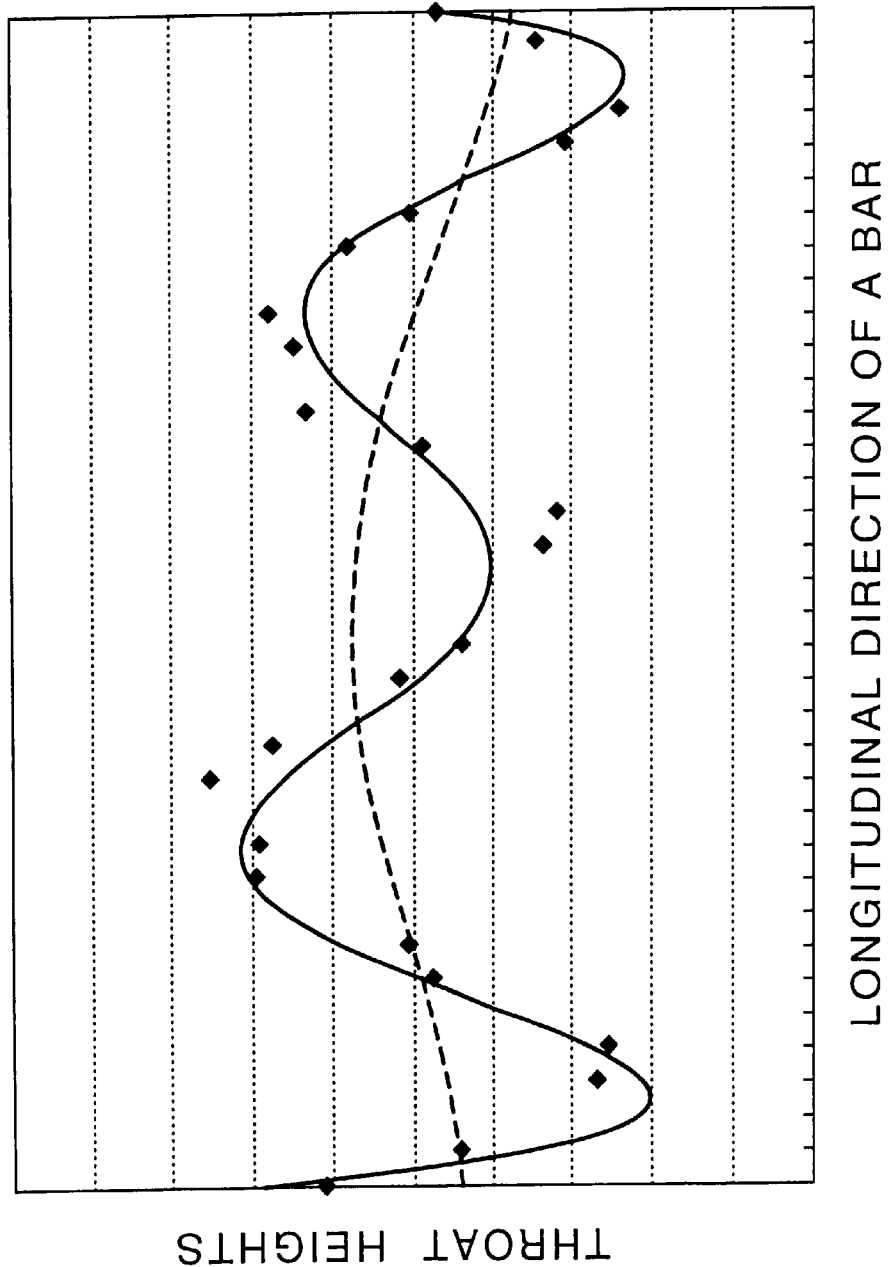
FIG. 28 is a graph showing an example of a distribution pattern of values of throat heights of a bar along a longitudinal direction of the bar when lapping the bar by using a conventional lapping apparatus.

After the first lapping process, a second lapping process is carried out by tilting the bottom surface 70b of the ceramic bar or workpiece 70 by at most about 3 degrees to the abrasive surface 102a of the lapping table 102. Thus, the slant line portion Q in FIG. 27 is lapped off. Namely, the motor 152 is activated to tilt the tilting assembly 146, the back plate 168, the lower end portion 190 of the back plate 168 and the tool 50 so that these components are tilted by at most 3 degrees to the vertical plane to the abrasive surface 102a of the lapping table 102, and then under this condition the bottom surface 70b of the ceramic bar or workpiece 70 is lapped. During the second lapping process, the right and left contact-type-sensors 282 detect the lapped amounts of the workpiece 70. Thereafter, when the lapped amounts detected by the right and left contact-type sensors 282 have reached to predetermined values, the second lapping process is over. During the second lapping process, the lapping head 120 and the adjuster ring 126 have a movement of the combination of rotation and reciprocation as in the first lapping process.

According to the second embodiment of the present invention, following advantageous effects can be obtained.

According to the lapping apparatus 100 of the second embodiment, same as the first embodiment, if the distribution of the values of the throat heights of the respective magnetic heads of the bar or workpiece 70 is a complicated pattern such as a pattern approximated by a high order curve before the lapping of the bar or workpiece 70, the supporting portion 52 of the tool 50 can be deformed so as to accurately correspond to the distribution pattern of the values of the throat heights. As a result, the throat heights of the respective magnetic heads can be accurately lapped along the entire length of the bar or workpiece 70 within a predetermined permissible range.

During the first and second lapping processes, the attitude of the lapping head 120 is controlled with respect to the abrasive surface 102a by the adjuster ring 126. Namely, the attitudes of the lapping head 122, the tilt assembly 146 and back plate 168 can be always controlled based on the abrasive surface 102a of the lapping table 102, and therefore a pushing force other than their weight can be applied to the bar or workpiece 70 so as to lap the workpiece 70.

The lapping head 120 and the adjuster ring 126 have a movement of the combination of rotation and reciprocation. Accordingly, in this aspect, the partial wear of the adjuster ring 126 can be avoided, and the flatness of the bottom surface of the bar or workpiece 70 is increased.

The bar or workpiece 70 is attached at only one point with the lower end portion 190 of the back plate 168. Therefore, even if the bar or workpiece 70 has been twisted in the rotation direction thereof, the lapping process can be carried out without the correction of the twisting condition and bad quality products are not generated under the twisting condition of the bar or workpiece 70.

Although the present invention has been explained with reference to specific, preferred embodiments, one of ordinary skill in the art will recognize that modifications and improvements can be made while remaining within the scope and spirit of the present invention. The scope of the present invention is determined solely by appended claims.

What is claimed is:

1. An apparatus for lapping a workpiece including a plurality of magnetic heads supported by a tool, the apparatus comprising:

a rotary lapping table having an abrasive surface;

a lapping device assembly provided so as to be movable with respect to the abrasive surface of the lapping table;

said lapping device assembly including means provided at a lower portion of the lapping device assembly for supporting the tool and means for respectively applying predetermined loads to a plurality of load applying portions of the tool, the load applying portions of the tool being disposed along the longitudinal direction of the tool; and said load applying means applying the loads from a plurality of different directions to at least one of the load applying portions of the tool so that the tool is deformed into a predetermined shape.

2. An apparatus according to claim 1, wherein said load applying means has means for applying a vertical load to at least one of the load applying portions of the tool.

3. An apparatus according to claim 1, wherein said load applying means has means for applying a horizontal load to at least one of the load applying portions of the tool.

4. An apparatus according to claim 1, wherein said load applying means has means for applying a rotating load to at least one of the load applying portions of the tool.

5. An apparatus according to claim 1, wherein said tool supporting means supports the tool at about a longitudinal center portion of the tool.

6. An apparatus according to claim 1, wherein said lapping device assembly further includes means for tilting the lapping device assembly about a tilt shaft parallel with the abrasive surface.

7. An apparatus according to claim 1, wherein the apparatus further comprises means for oscillating the lapping device assembly in a predetermined angle.

8. A method for lapping a workpiece including a plurality of magnetic heads, the method comprising the steps of:

providing a tool for supporting the workpiece, a rotary lapping table having an abrasive surface, and a lapping device assembly provided so as to be movable with respect to the abrasive surface of the lapping table, said lapping device assembly including means provided at a lower portion of the lapping device assembly for supporting the tool;

attaching the tool to the tool supporting means of the lapping device assembly, the tool having a plurality of load applying portions disposed along the longitudinal direction thereof; and lapping the plurality of magnetic heads of the workpiece by applying the loads from a plurality of different directions to at least one of the load applying portions of the tool so that the tool is deformed into a predetermined shape.

9. A method according to claim 8, wherein said lapping step includes the step of applying a vertical load to at least one of the load applying portions of the tool.

10. A method according to claim 8, wherein said lapping step includes of the step of applying a horizontal load to at least one of the load applying portions of the tool.

11. A method according to claim 8, wherein said lapping step of includes the step of applying a rotating load to at least one of the load applying portions of the tool.

12. A method according to claim 8, wherein said tool supporting means supports the tool at about a longitudinal center portion of the tool.

13. A method according to claim 8, wherein the method further comprises the step of tilting the lapping device assembly about a tilt shaft parallel with the abrasive surface.

14. A method according to claim 8, wherein the method further comprises the step of oscillating the lapping device assembly in a predetermined angle.

* * * * *